(12) United States Patent
Suzuki et al.

(10) Patent No.: US 6,625,105 B2
(45) Date of Patent: Sep. 23, 2003

(54) PICKUP APPARATUS AND METHOD OF MANUFACTURING THE SAME

(75) Inventors: Jun Suzuki, Tokorozawa (JP); Katsumi Ishii, Tokorozawa (JP); Takashi Nakai, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 72 days.

(21) Appl. No.: 09/778,847

(22) Filed: Feb. 8, 2001

(65) Prior Publication Data

US 2001/0028628 A1 Oct. 11, 2001

(30) Foreign Application Priority Data

Feb. 9, 2000 (JP) ........................................ 2000-032507

(51) Int. Cl.$^7$ .............................................. G11B 17/00
(52) U.S. Cl. .................................... 369/244; 369/44.15
(58) Field of Search ................................ 369/244, 77.1, 369/77.2, 44.15, 44.16, 44.22; 359/824, 814

(56) References Cited

U.S. PATENT DOCUMENTS 5,657,172 A * 8/1997 Shibata et al. ................ 310/27
5,666,235 A * 9/1997 Izuka .......................... 359/814
6,404,728 B1 * 6/2002 Shinozuka et al. ......... 264/251

* cited by examiner

Primary Examiner—William Korzuch
Assistant Examiner—Mark Blouin
(74) Attorney, Agent, or Firm—Morgan, Lewis & Bockius LLP

(57) ABSTRACT

A pickup apparatus capable of omitting an actuator cover and reducing the dimensions thereof, and a method of manufacturing the same. This apparatus is formed of an actuator unit in which a movable unit made by fixing printed board coils on both side surfaces of an objective lens-containing lens holder is supported movably on four wire-form elastic members fixed to an actuator base, and a suspension base which is provided with a pair of yokes to which a pair of magnets disposed in a mutually opposed state are fixed with a predetermined width of magnetic space left therebetween, and which has standing portions. A range of a movement in a focusing direction of the movable unit is restricted by inserting stopper members into insert holes of the standing portions.

4 Claims, 16 Drawing Sheets

PICKUP APPARATUS AND METHOD OF MANUFACTURING THE SAME

BACKGROUND OF THE INVENTION

1. Field of the Invention

This invention relates to a pickup apparatus for optically writing or reading information in or out of a disk type recording medium, such as a compact disk and an optical disk, and a method of manufacturing the same.

2. Description of Related Art

A pickup apparatus for reproducing the information recorded in an optical disk, such as a CD and a DVD has heretofore been known. A pickup apparatus is formed so as to carry out for the purpose of accurately reading the information recorded on an optical disk a focus control operation for controlling a distance between an information recording surface of the optical disk and an objective lens with respect to the flexure and deflection of the optical disk, and a tracking control operation for the follow-up controlling of the objective lens with respect to the eccentricity of an information track of the optical disk.

Conventional pickup apparatuses are constructed so that a range of a movement of a movable unit including an objective lens is restricted by using an actuator cover. Therefore, the size in the direction of the height of the pickup apparatus becomes large. This prevents the reduction of the dimensions and weight of the pickup apparatus, and causes the cost of manufacturing the apparatus to increase due to an increase in the number of parts thereof.

OBJECT AND SUMMARY OF THE INVENTION

The present invention has been made in view of the above circumstances, and provides a pickup apparatus capable of rendering an actuator cover unnecessary and reducing the dimensions and weight thereof; and a method of manufacturing the same.

According to an aspect of the present invention, the pickup apparatus has a lens holder and an actuator base which are connected together via plurality of elastic members to thereby support the lens holder movably, the lens holder having on both sides thereof a pair of elastic member-fixing parts which project from such portions thereof that are spaced from each other in a focusing direction, and which have a pair of elastic members fixed thereto respectively, and a stopper member positioned between the two elastic member-fixing parts and restricting a range of a movement of the lens holder in the focusing direction thereof.

According to another aspect of the present invention, the pickup apparatus has a lens holder and an actuator base which are connected together via plurality of wire-form elastic members to thereby support the lens holder movably in a focusing direction and tracking direction, the lens holder having a pair of elastic member-fixing parts which project from such portions thereof which are spaced from each other in the focusing direction, and which have a pair of wire-form elastic members fixed thereto respectively, the actuator base having a pair of standing members which are provided in positions spaced from each other in the tracking direction with the lens holder held therebetween, and which are adapted to restrict a range of a movement of the lens holder in the tracking direction, and stopper members which project from the standing members so as to be positioned between the two elastic member-fixing parts, and which are adapted to restrict a range of a movement of the lens holder in the focusing direction.

According to still another aspect of the present invention, the pickup apparatus has a lens holder and a suspension base which are molded in an integral state between both ends of plurality of wire-form elastic members, the suspension base being fixed to an actuator base, whereby the lens holder is supported so as to be movable in the focusing direction and tracking direction, the lens holder having on both sides thereof a pair of elastic member-fixing parts which project from such portions thereof that are spaced from each other in a focusing direction, and which have a pair of elastic members fixed thereto respectively, the actuator base having a pair of standing members which are provided in positions spaced from each other in the tracking direction with the lens holder held therebetween, and which are adapted to restrict a range of movement of the lens holder in the tracking direction, and stopper members which project from the standing members so as to be positioned between the two elastic member-fixing parts, and which are adapted to restrict a range of a movement of the lens holder in the focusing direction.

According to a further aspect of the present invention, the method of manufacturing the above-described pickup apparatus, in which a lens holder and a suspension base are connected together via plurality of wire-form elastic members, the suspension base being fixed to an actuator base, the lens holder including on both sides thereof a pair of (elastic member-) fixing parts which project from such portions thereof that are spaced from each other in a focusing direction, and which have the wire-form elastic members fixed thereto respectively, has the steps of molding the lens holder and suspension member in an integral state out of a resin on the both ends of the wire-form elastic member so as to fix the suspension base to the actuator base and set the lens holder in a predetermined position, and thereafter positioning stopper members, which are used for restricting a range of a movement of the lens holder in the focusing direction, between the two elastic member-fixing parts of the lens holder set in a predetermined position.

BRIEF DESCRIPTION OF THE DRAWINGS

Preferred embodiments of the present invention will be described in detail with reference to the following figures, wherein.

DETAILED DESCRIPTION OF PREFERRED EMBODIMENTS

Figure 1:
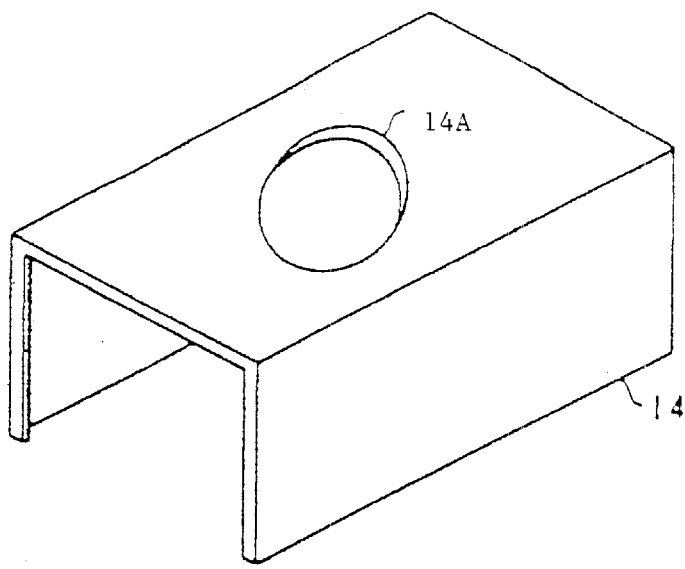
FIG. 1 is a drawing showing the construction of an example of a related art pickup apparatus.
Figure 1:
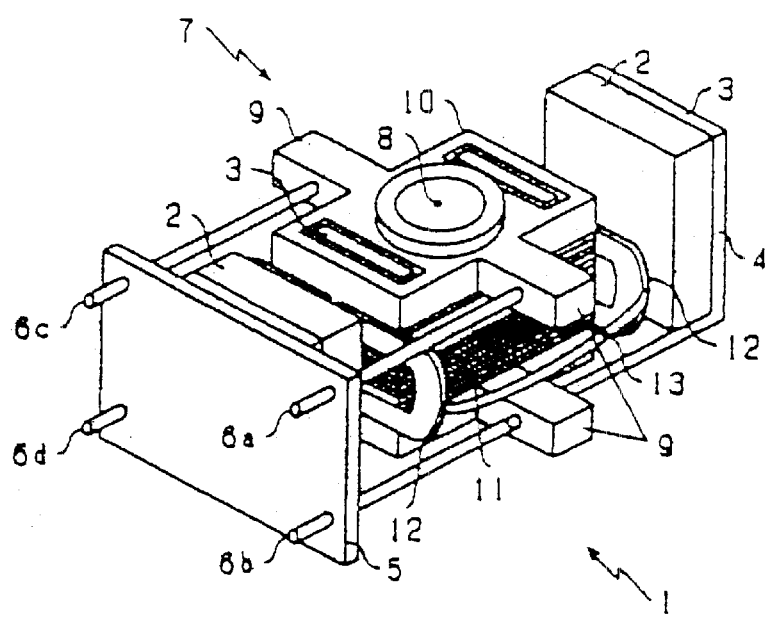

Before entering into a description of the pickup apparatus according to the present invention, a conventional pickup apparatus will be described with reference to the drawing.

FIG. 1 is a perspective view showing an example of a conventional pickup apparatus.

As shown in the drawing, a pickup apparatus 1 is formed of a plate type actuator base 4 on which yokes 3, to which a pair of magnets 2 are fixed, are provided in a mutually opposed state, a movable unit 7 supported movably on four support wires 6a–6d on a support base 5 fixed to a side surface of the actuator base 4 by screws (not shown), and an actuator cover 14 adapted to protect the movable unit 7, provided in a top wall thereof with an opening 14A for an objective lens 8, and formed in the shape of a box out of a metal or a resin. The movable unit 7 includes a lens holder 10 provided therein with an objective lens 8 and having four fixing arms 9 projecting in a tracking direction, a focusing coil 11 wound around a trunk portion of the lens holder 10, and four D-shaped tracking coils 12 fixed to both side surfaces of the lens holder 10 opposed to the magnets 2.

The movable unit 7 is supported movably on the actuator base 4 by securing the four fixing arms 9 of the lens holder 10 to the four support wires 6a–6d provided on the support base 5. The four support wires 6a–6d support the movable unit movably, and are used as connecting wires for supplying a driving current to the focusing coil 11 and four tracking coils 12, so that these wires are formed of elastic members of a high conductivity.

The focusing coil 11 wound around the trunk portion of the lens holder 10 is connected at one end thereof to, for example, a support wire 6a, and at the other end thereof to the support wire 6b. Therefore, when a focusing driving current is supplied to the two support wires 6a, 6b on the support base 5, the movable unit 7 is driven in the focusing direction. The four tracking coils 12 fixed to both side surfaces of the lens holder 10 are all connected in series by using two support wires 6c, 6d and a wire member 13.

Namely, one support wire 6c is connected to an end of one wire of the two tracking coils 12 fixed to one side surface of the lens holder 10 and series-connected together, and the other support wire 6d to one end of one wire of the two tracking coils 12 fixed to the other side surface of the lens holder 10 and series-connected together. The other ends of the tracking coils 12 are connected together by the wiring member 13, whereby four tracking coils 12 are series-connected to the two support wires 6c, 6d. Accordingly, when a tracking driving current is supplied to the two support wires 6c, 6d, the movable unit 7 is driven in the tracking direction.

As described above, the movable unit 7 of the pickup apparatus 1 is supported movably by the four support wires 6. Therefore, there is the possibility that, when the movable unit 7 receives a strong vibration, it is moved greatly, for example, in the focusing direction to cause the objective lens 8 to collide with an information recording surface of the optical disk and hurt the same. In view of this, the pickup apparatus 1 is generally adapted to restrict a range of a movement of the movable unit 7 in the focusing direction and tracking direction by providing an actuator cover 14.

However, when the actuator cover 14 is provided, the size of the pickup device 1 in the direction of the height thereof increases to a high level. This prevents the reduction of the dimensions and weight of the apparatus, and causes the number of parts and the cost of manufacturing the apparatus to increase.

Figure 2:
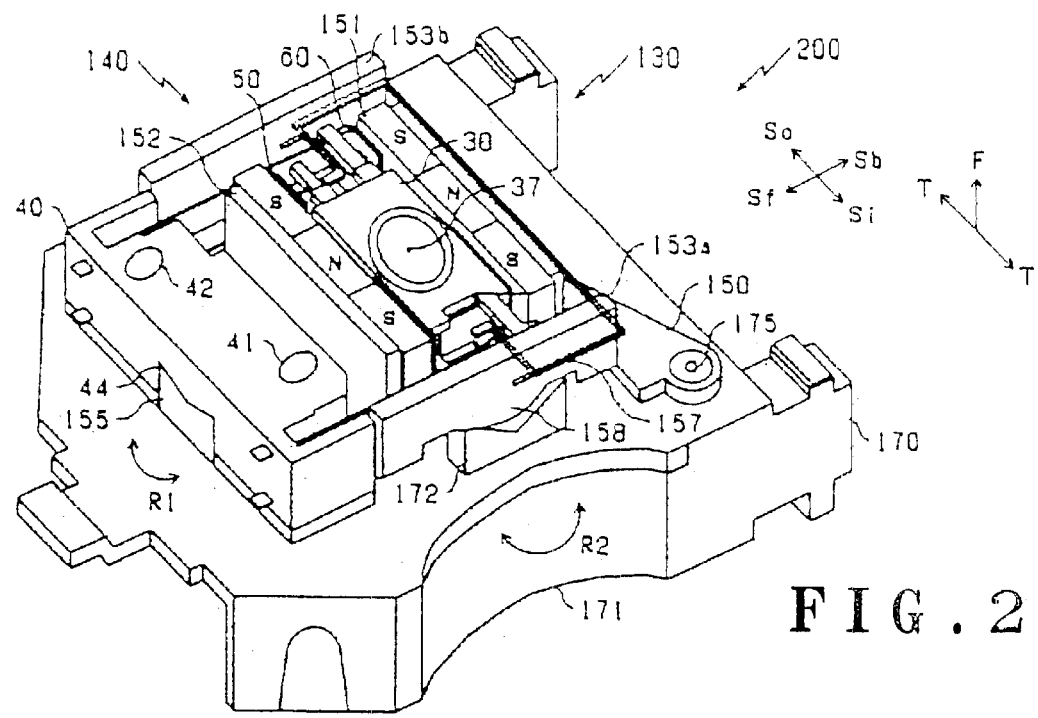
FIG. 2 is a perspective view of an embodiment of the pickup apparatus according to the present invention.
Figure 3:
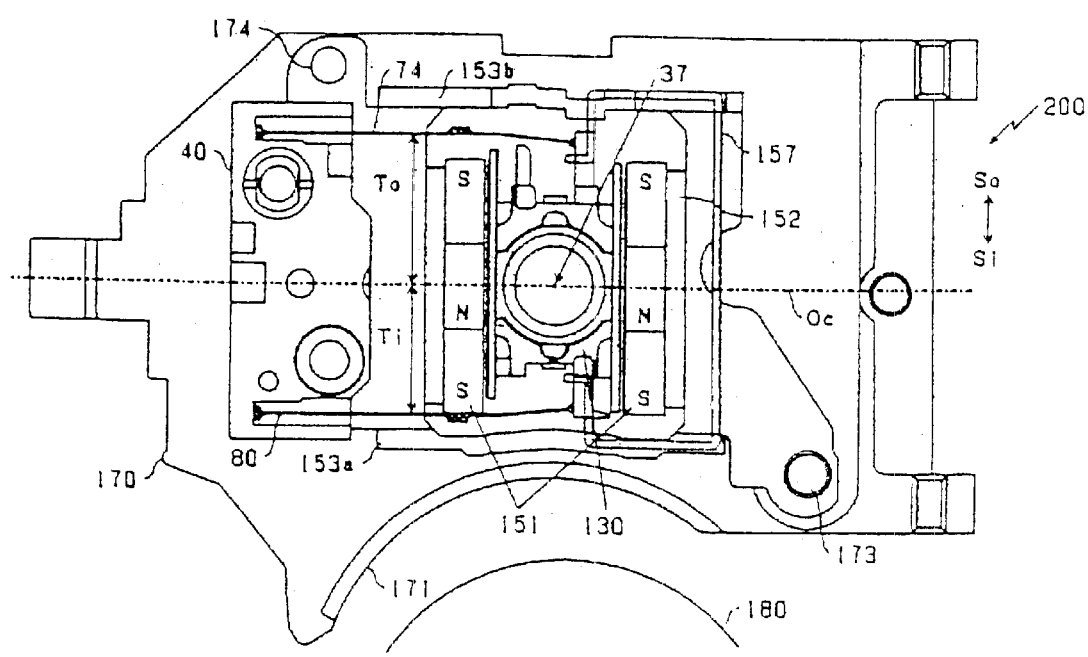
FIG. 3 is a plan view of the embodiment of the pickup apparatus according to the present invention.
Figure 4:
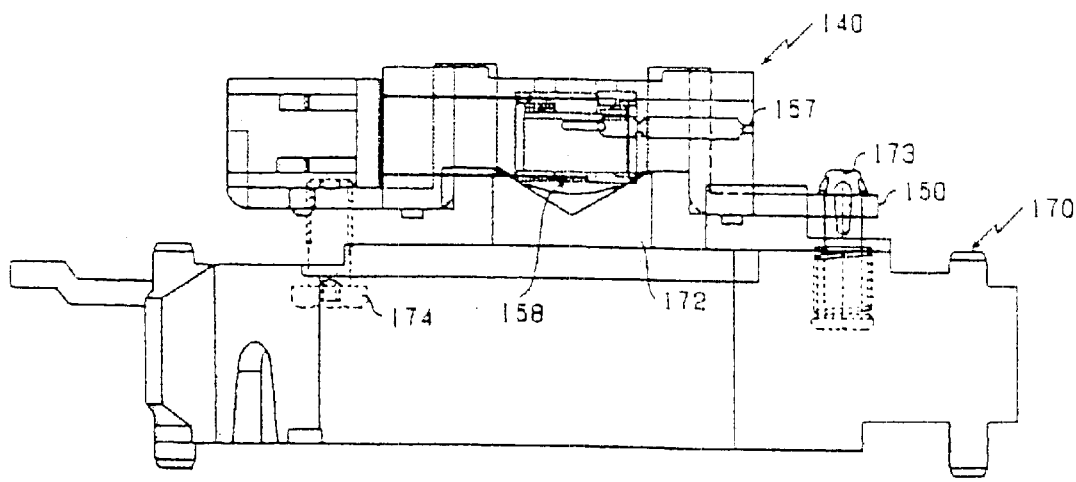
FIG. 4 is a side view of an inner circumferential portion of the embodiment of the pickup apparatus according to the present invention.

FIG. 2 is a perspective view of a principle portion of a pickup apparatus 200, an embodiment of the present invention. FIG. 3 is a plan view of the pickup apparatus 200, and FIG. 4 a side view taken from the side of a spindle motor 180 of the pickup apparatus 200. The construction of the pickup apparatus 200 will now be described with reference to FIGS. 2–4.

The pickup apparatus 200 according to the present invention includes an actuator unit 140, in which a movable unit 130 having a printed board A coil 50 and a printed board B coil 60 fixed to both side surfaces of a lens holder 30 containing an objective lens 37 therein, is connected to an actuator base 40 by four wire-form elastic members 74, 94, 80, 104, whereby the movable unit 130 is supported movably; a suspension base 150 provided with a pair of yokes 152 to which a pair of multipolar magnetized magnets 151, which are formed of I-shaped N-poles and U-shaped S-poles arranged in an opposed state with predetermined size of magnetic spaces provided on both side surfaces of the movable unit 130 are fixed, and standing portions 153 arranged in an opposed state so as to surround side surfaces, which extend in the tracking direction (shown by an arrow T in the drawing), of the movable unit 130; and a pickup body 170 which is made of an aluminum die casting and houses therein optical parts, such as a light source, a collimater lens and beam splitter (none of which is shown), and which is provided with a semicircular recess 171 in the side surface (which will hereinafter be referred to as an inner circumferential direction, and which is shown by an arrow Si, while an outer circumferential surface opposite thereto by an arrow So) thereof which is close to a spindle motor 180.

The actuator unit 140 is fixed to the suspension base 150 by inserting spring-carrying screws and fixing screws (none of which is shown) into two fixing holes 41, 42 of the actuator base 40. The actuator unit 140 is fixed in the condition in which the posture thereof in the directions of an arrow R1 in FIG. 2 has been regulated, owing to the engagement with each other of a V-shaped recess 44 formed in a bottom surface of the suspension base 40 and an M-shaped projecting plate 155 formed on the suspension base 150. The actuator unit 140 is inserted at one end portion thereof into a spring-carrying support post 173 fixed to a pickup body 170, and the other end portion thereof is fixed by a fixing screw 174. The suspension base 150 is fixed in the condition in which the posture thereof in the directions of an arrow R2 in FIG. 2 has been regulated, owing to the engagement with each other of projections 158 formed on the left and right standing members 153a, 153b and M-shaped retainer members 172 of the pickup body 170.

In the pickup apparatus 200 as the embodiment of the present invention, the semicircular recess 171 is provided in the side surface which faces in the inner circumferential direction Si of the pickup body 170, so that the pickup apparatus is positioned close to the spindle motor 180 easily. As shown in FIG. 3, in the pickup apparatus 200, a distance Ti between wire-form elastic members 80, 104 supporting the movable unit 130 and an optical center of the objective lens 37 (line shown by Oc, including an optical axis of the objective lens 37 and perpendicular to the tracking direction) is set smaller than that To between wire-form elastic members 74, 94 and the optical center Oc of the objective lens 37. Since the wire-form elastic members 74, 94; 80, 104 supporting the movable unit 130 are thus provided in asymmetric positions with respect to the optical center Oc of the objective lens 37, the objective lens 37 of the pickup apparatus 200 can be positioned more closely to the inner circumferential side of an optical disk.

As described above, the pickup apparatus 200 in the embodiment of the present invention is provided with a semicircular recess 171 in the pickup body 170, and the fixing positions of the four wire-form elastic members 74, 94; 80, 104, which support the movable unit 130, asymmetrically with respect to the optical center Oc of the objective lens 37, whereby the pickup apparatus 200 is formed so as to be positioned more closely to the spindle motor 180 and the inner circumferential side of the optical disk. A movable unit 130 thus constructed generates a rotational moment. However, the mode of embodiment of the pickup apparatus 200 according to the present invention, in which the construction of the actuator unit 140 has been specially devised, attains the reduction of the dimensions and weight thereof without generating a rotational moment. The construction of the actuator unit 140 as a whole which is used in the mode of embodiment of the pickup apparatus 200 according to the present invention will now be described with reference to FIG. 5. The construction of each member constituting the actuator unit 140 will also be described in detail at the same time.

Figure 5:
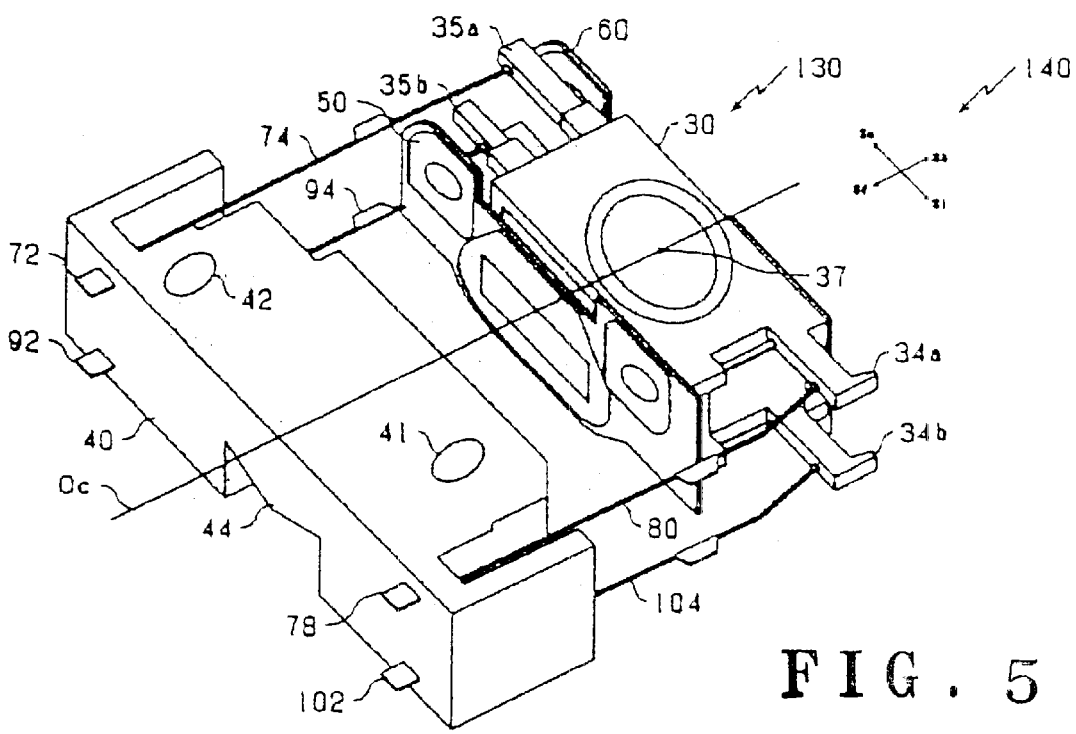
FIG. 5 is a perspective view of an actuator unit constituting the pickup apparatus.

As shown in FIG. 5, the actuator unit 140 is formed by supporting movably the movable unit 130, which has a printed board A coil 50 fixed to a side surface facing in the forward direction (shown by an arrow Sf in the drawing) of the lens holder 30, in which the objective lens 37 is contained, and a printed board B coil 60 fixed to a side surface facing in the backward direction (shown by an arrow Sb in the drawing) of the lens holder 30, by the four wire-form elastic members 74, 80, 94, 104 fixed to the actuator base 40. The four wire-form elastic members 74, 80, 94, 104 constituting the actuator unit 140 are made integral by the insert molding during the molding of the lens holder 30 and actuator base 40 out of a resin.

Figure 6:
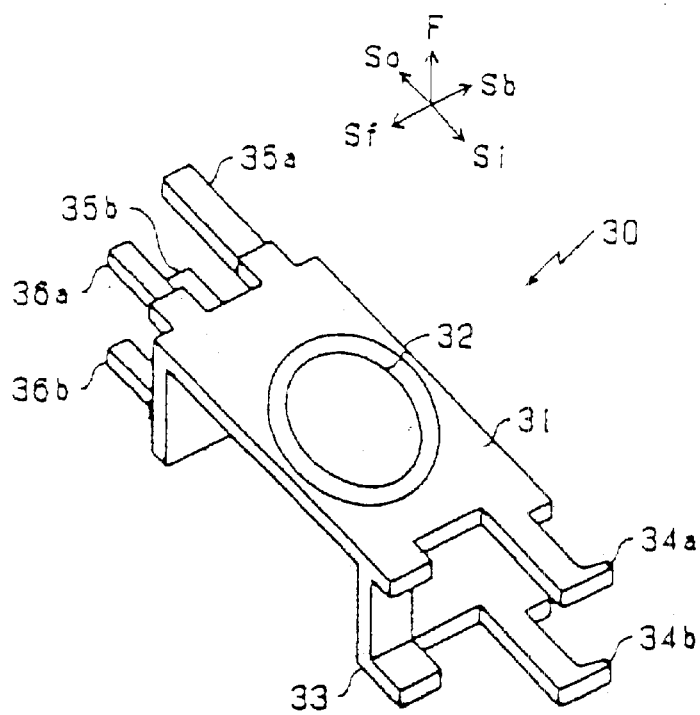
FIG. 6 is a perspective view of a lens holder constituting a movable unit.
Figure 7:
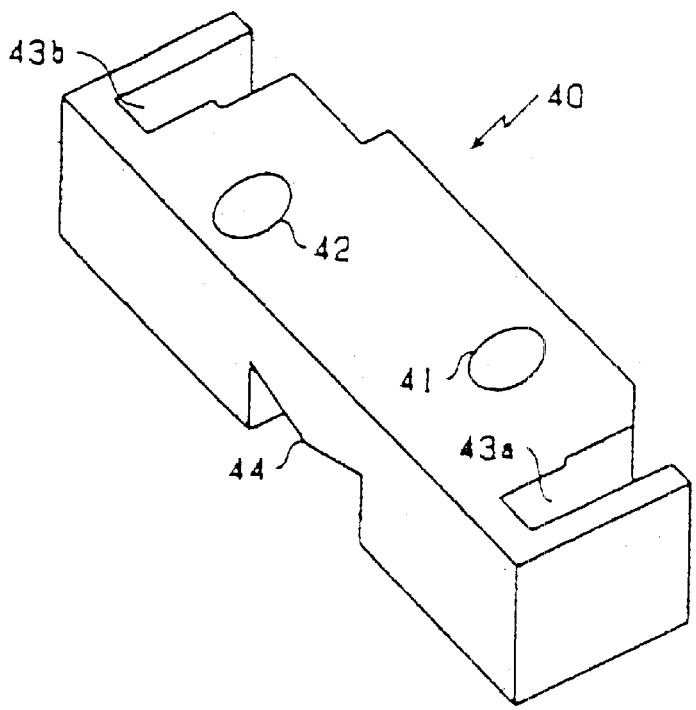
FIG. 7 is a perspective view of an actuator base constituting the movable unit.

The lens holder 30 and actuator base 40 which constitute the actuator unit 140 have structures shown in FIGS. 6 and 7. FIG. 6 is a perspective view of the lens holder 30, and FIG. 7 a perspective view of the actuator base 40.

The lens holder 30 is a member molded out of a resin to a hollow, substantially square structure, and having an opening 32 for the objective lens 37 in the substantially central portion of a top plate 31. The lens holder 30 includes a pair of fixing arms 34a, 34b forming elastic member-fixing parts projecting horizontally in the inner circumferential direction Si from the portions facing in a rearward direction Sb of the lens holder 30 of the top plate 31 and a bottom plate 33 spaced from the top plate 31 in the focusing direction (shown by an arrow F in the drawing), a pair of fixing arms 35a, 35b forming the other elastic member-fixing parts projecting horizontally from the portions facing in the rearward direction Sb of the lens holder 30 of the top plate 31 and bottom plate 33 in the outer circumferential direction So, and a pair of projections 36a, 36b forming terminal fixing parts extending horizontally in the outer circumferential direction So from the portions of the top plate 31 and bottom plate 33 which face a front side Sf of the lens holder 30.

As shown in FIG. 7, the actuator base 40 is a substantially rectangular member molded out of a resin, and having two fixing holes 41, 42 formed so as to fix the actuator base to the suspension base 150, grooves 43a, 43b provided with four wire-form elastic members 74, 80, 94, 104 molded in an integral state in both side portions of the suspension base with respect to the longitudinal direction thereof, and a posture regulating V-shaped recess 44 in a bottom portion thereof.

Figure 8:
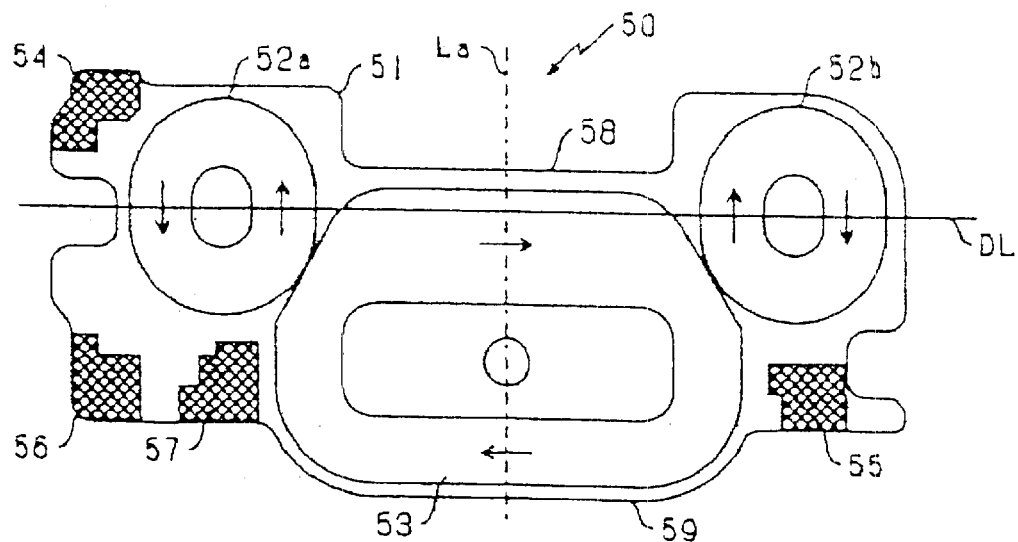
FIG. 8 is a construction diagram of a printed board A coil constituting the movable unit.
Figure 9:
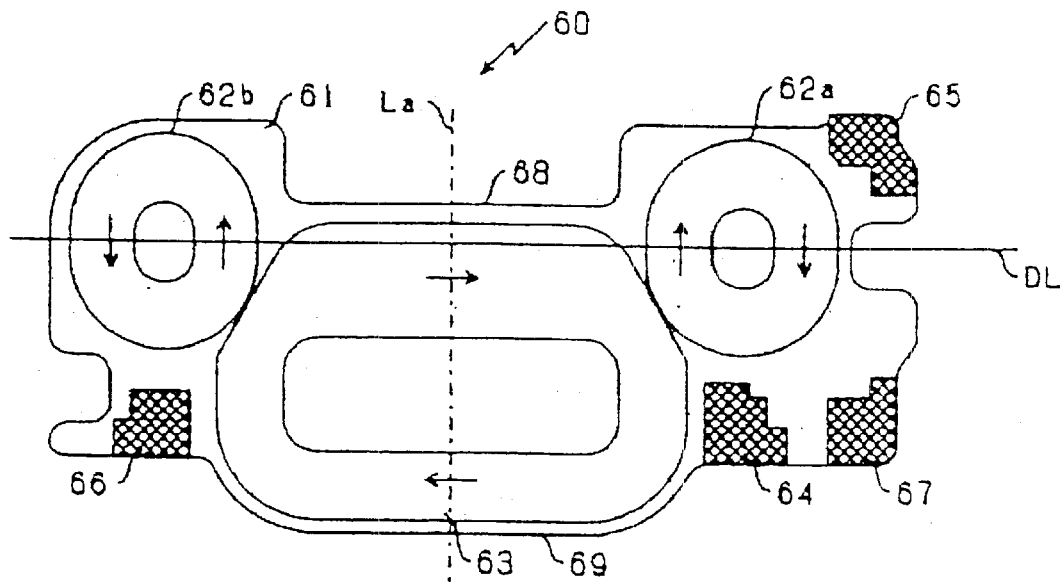
FIG. 9 is a construction diagram of a printed board B coil constituting the movable unit.

The construction of the printed board A coil 50 and printed board B coil 60 which serve as driving coils constituting the movable unit 130 will now be described with reference to FIGS. 8 and 9. The printed board A coil 50 shown in FIG. 8 is fixed to the side surface of the lens holder 30 which faces in the forward direction Sf, so that the coils and terminals, which will be described later, are formed on the lens holder 30 side. Therefore, in order to render this condition easily understandable, a base plate 51 is shown in section. Namely, the coils and terminals are formed on the same plane on a rear surface of the drawing. Since the printed board B coil 60 shown in FIG. 9 is fixed to the side surface of the lens holder 30 which faces in the rearward direction Sb thereof, coils and terminals are shown as parts formed on the same plane on the surface on this side of the drawing.

The printed board A coil 50 is formed by pattern molding coils and wires on a planar base plate 51 by a copper plating operation as shown in FIG. 8, and having on the same plane a tracking A coil 52a, a tracking B coil 52b, a focusing A coil 53, four terminals made of copper foil (a tracking A input terminal 54, a tracking A output terminal 55, a focusing A terminal 56 and a focusing A output terminal 57). The tracking A coil 52a and tracking B coil 52b are provided on an upper portion of the base plate 51, and formed to the same shape symmetrically with respect to the optical axis La. The focusing A coil 53 has a coil center on the optical axis La, and is formed on the lower side of a line of action DL connecting the coil centers of the tracking A coil 52a and tracking B coil 52b together. The base plate 51 has a recess 58 formed by cutting off an upper portion thereof and a projection 59 formed by bulging a lower portion thereof, for the purpose of bearing thereon a counterweight of the movable unit 130 which will be described later.

A wire connecting method for the printed board A coil 50 will now be described below. The tracking A coil 52a connected to the tracking A input terminal 54 is formed so as to extend counter-clockwise from the outer circumferential side to the inner circumferential side, and connected to the tracking B coil 52b via a through hole and copper foil (none of which is shown). The tracking B coil 52b is formed so as to extend clockwise from the inner circumferential side to the outer circumferential side, and connected to the tracking A output terminal 55. Therefore, the tracking A coil 52a and tracking B coil 52b are series-connected between the tracking A input terminal 54 and tracking A output terminal 55.

The focusing A coil 53 connected to the focusing A input terminal 56 is formed so as to extend clockwise from an outer circumference to an inner circumference thereof, and connected to the focusing A output terminal 57 via a through hole and copper foil.

The printed board B coil 60 shown in FIG. 9 is formed in the same manner as the printed board A coil 50 by pattern molding coils and wires on a planar base plate 61 by a copper plating operation, and having on the same plane a tracking C coil 62a, a tracking D coil 62b, a focusing B coil 63, four terminals formed out of copper foil (a tracking B input terminal 64, a tracking B output terminal 65, a focusing B input terminal 66 and a focusing B output terminal 67). The tracking C coil 62a and tracking D coil 62b are provided on an upper portion of the base plate 61, and formed to the same shape symmetrically with respect to an optical axis La. The focusing A coil 63 has a coil center on the optical axis La, and is formed on the lower side of a line of action DL which connects the coil centers of the tracking C coil 62a and tracking D coil 62b together. The base plate 61 is provided with a recess 68 formed by cutting off an upper portion thereof, and a projection 69 formed by bulging a lower portion thereof just as that of the printed board A coil 50. A wire connecting method for the printed board B coil 60 will now be described below. The tracking C coil 62a connected to the tracking B input terminal 64 is formed so as to extend clockwise from an outer circumference to an inner circumference thereof, and connected to the tracking D coil 62b via a through hole and copper foil (none of which is shown). The tracking D coil 62b is formed so as to extend counter-clockwise from an inner circumference to an outer circumference thereof, and connected to a tracking B output terminal 65. Therefore, the tracking C coil 62a and tracking D coil 62b are series-connected together between the tracking B input terminal 64 and tracking B output terminal 65. The focus B coil 63 connected to the focus B input terminal 66 is formed clockwise from an outer circumference to an inner circumference thereof, and connected to the focusing B output terminal 67 via a through hole and copper foil.

Figure 10:
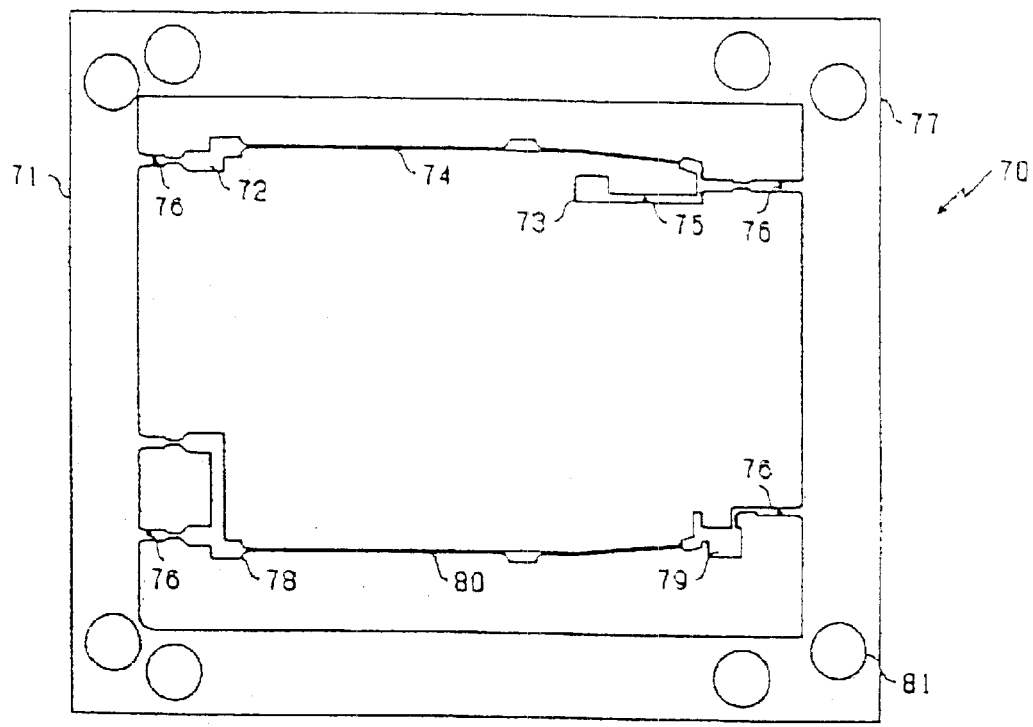
FIG. 10 is a construction diagram of an upper suspension frame used for the movable unit.

The construction of four wire-form elastic members 74, 80, 94, 104 insert molded during the molding of the lens holder 30 and actuator base 40 out of a resin will now be described with reference to FIGS. 8 and 11. FIG. 10 is a plan view of the upper suspension frame 70 on which the two wire-form elastic members 74, 80 and connecting portions thereof are formed by punching a flat metal plate by press working to remove unnecessary portions thereof, and FIG. 11 a plan view of a lower suspension frame 90 on which the two wire-form elastic members 94, 104 and connecting portions thereof are formed by punching a flat metal plate by press working to remove unnecessary portions thereof.

The upper suspension frame 70 is positioned on the side of the top plate 31 of the lens holder 30 when the frame 70 is molded on the lens holder 30 so as to be integral therewith, and bears thereon a tracking input terminal 72 and a tracking output terminal 78 both of which will be described later. The lower suspension frame 90 is positioned on the side of the bottom plate 33 of the lens holder 30 when the frame 90 is molded on the lens holder 30 so as to be integral therewith, and bears thereon a focusing input terminal 92 and a focusing output terminal 102 both of which will be described later. The upper suspension frame 70 and lower suspension frame 90 have a function of a suspension, and a wiring function for supplying a driving current to the printed board coils 50, 60, and are formed of metal plates 71, 91 of a small thickness (for example, around 0.1 mm) having an elasticity and a high conductivity, for example, plates of copper titanate, phosphor bronze and beryllium copper. Such metal plates 71, 91 are elongated hoop materials formed by connecting the four wire-form elastic members 74, 80, 94, 104 and connecting portions thereof to a frame member 77 by retainer members 76 by punching work using a metal mold. These metal plates 71, 91 are provided plurality ofly at predetermined intervals with the productivity taken into consideration.

As shown in FIG. 10, on the upper suspension frame 70, the tracking input terminal 72 insert molded on the actuator base 40, and the tracking A input connecting part 73 insert molded on the lens holder 30 are connected together by the wire-form elastic member (outer circumferential A wire) 74 and an A coupling member 75, and held on the frame member 77 by retainer members 76. A tracking output terminal 78 insert molded on the upper suspension base 70 and a tracking B output connecting part 79 insert molded on the lens holder 30 are connected together by a wire-form elastic member (inner circumferential A wire) 80, and held on the frame member 77 by retainer members 76. The frame member 77 of the upper suspension frame 70 is provided with plurality of fixing holes 81 for fixing the frame member accurately in a predetermined position in a metal mold which will be described later.

Figure 11:
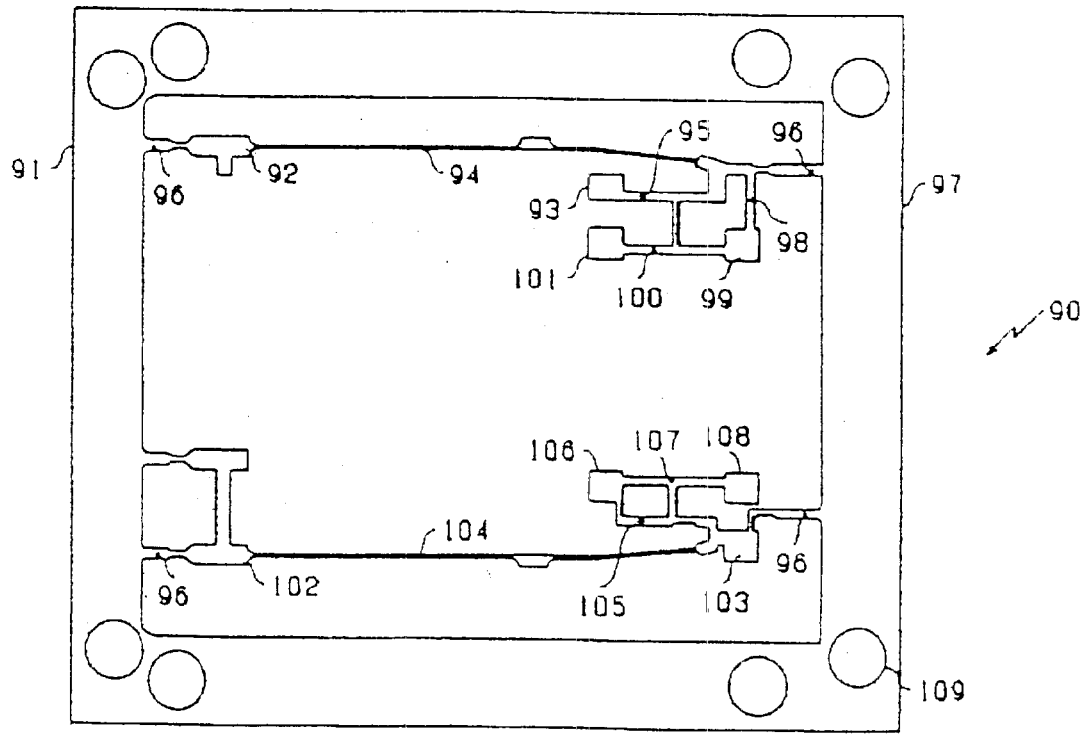
FIG. 11 is a construction diagram of a lower suspension frame used for the movable unit.

As shown in FIG. 11, on the lower suspension frame 90, a focusing input terminal 92 insert molded on the actuator base 40 and a focusing A input connecting part 93 insert molded on the lens holder 30 are connected together by a wire-form elastic member (outer circumferential B wire) 94 and a B coupling member 95, and a focusing B input connecting part 99 held on a frame member 97 by retainer members 96 and connected to an outer circumferential B wire 94 by a C coupling member 98 is connected to a focus B output connecting part 101 by a D coupling member 100.

A focusing output terminal 102 insert molded on the actuator base 40, and a focusing B output connecting part 103 insert molded on the lens holder 30 are connected together by a wire-form elastic member (inner circumferential B wire) 104 and held on a frame member 97 by retainer members 96, and the inner circumferential B wire 104 is connected to a tracking A output connecting part 106 by an E coupling member 105, a tracking B input connecting part 108 being connected to the tracking A output connecting part 106 by an F coupling member 107. The frame member 97 of the lower suspension frame 90 is provided with plurality of fixing holes 109 just as the upper suspension frame 70.

The upper and lower suspension frames 70, 90 are formed of metal plates 71, 91 of an equal thickness (H). The outer circumferential A wire 74 of the upper suspension frame 70 and the outer circumferential B wire 94 of the lower suspension frame 90 are formed in the same positions with respect to the frame members 77, 97, and to an equal width (Wo). The inner circumferential A wire 80 of the upper suspension frame 70 and the inner circumferential B wire 104 of the lower suspension frame 90 are formed in the same positions with respect to the frame members 77, 97, and to an equal width (Wi). Although the details will be described later, the width (Wo) of the outer circumferential A wire 74 of the upper suspension frame 70 and the outer circumferential B wire 94 of the lower suspension frame 90 are set smaller than that (Wi) of the inner circumferential B wire 80 of the upper suspension frame 70 and the inner circumferential B wire 104 of the lower suspension frame 90. The above is a description of each members constituting the actuator unit 140.

A method of manufacturing the actuator unit 140 will now be described with reference to FIGS. 12–17A–17C. First, a metal mold structure used when the lens holder 30 and actuator base 40 are molded in an integral state by using the upper and lower suspension frames 70, 90, and a resin molding procedure will be described with reference to FIG. 12. Although the metal mold has an integral resin-filling cavity for the molding of the lens holder 30 and actuator base 40, FIG. 12 shows the construction of a principal portion of the metal mold, i.e. only the portion thereof in which the lens holder 30 is molded, and illustrations of minute portions of the metal mold are omitted so as to simplify the description.

Figure 12:
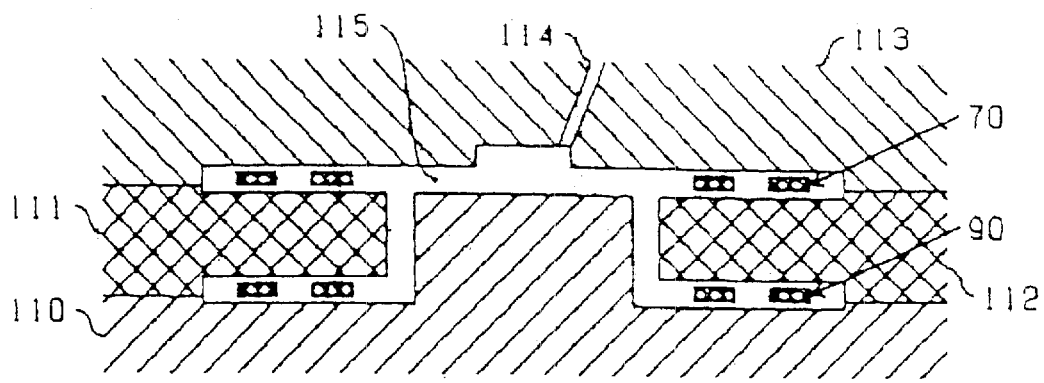
FIG. 12 is a construction diagram of a principal portion of a metal mold used when a suspension unit is molded.

As shown in FIG. 12, the metal mold includes four mold members, i.e. a lower fixed mold member 110, a pair of, i.e. left and right movable mold members 111, 112, and an upper movable mold member 113. The upper movable mold member 113 is provided with an injection bore 114 into which a resin is injected. First, a lower suspension frame 90 is fixed in this metal mold.

The lower suspension frame 90 is fixed in a predetermined position on the lower fixed mold member 110 of the metal mold. Since the lower fixed mold member 110 is provided with positioning pins (not shown), the lower suspension frame 90 can be positioned accurately with respect to the lower fixed mold member 110 by engaging the fixing holes 109 of the lower suspension frame 90 with these pins. The left and right movable mold members 111, 112 are then placed in predetermined positions on the lower fixed mold member 110 with the lower suspension frame 90 held therebetween. The upper suspension frame 70 is then fixed in a predetermined position on the left and right movable mold members 111, 112. Since the left movable mold member 111 or right movable mold member 112 is provided with positioning pins (not shown) just as the lower fixed mold member 110, the upper suspension frame 70 is positioned accurately on the left and right movable mold members 111, 112 by engaging the fixing holes 81 of the upper suspension frame 70 with these pins. Finally, the upper movable mold member 113 is placed on the left and right movable mold members 111, 112 with the upper suspension frame 70 held therebetween. Thus, the insertion of the upper and lower suspension frames 70, 90 into the metal mold is completed, and a resin-filling cavity 115 for the molding of the lens holder 30 is formed so as to enclose the upper and lower suspension frames 70, 90. The above is a description of a first step of the actuator unit manufacturing method.

Figure 13:
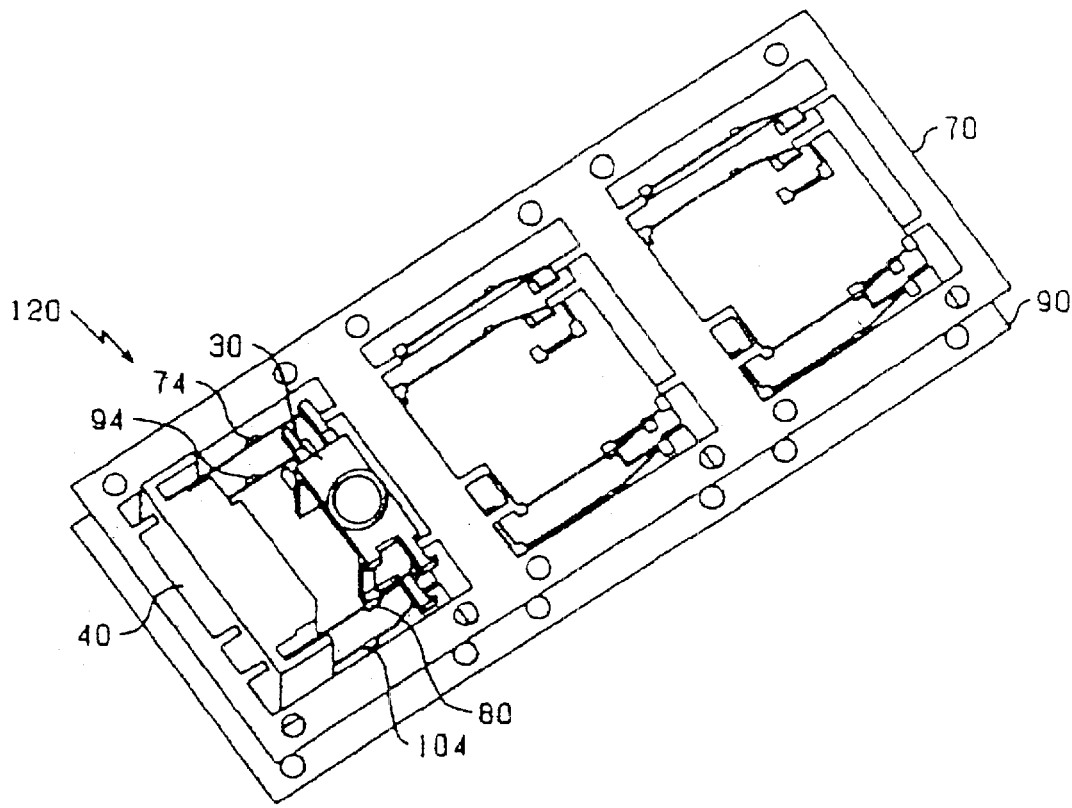
FIG. 13 is a perspective view showing a delivered condition of suspension units.

The resin-filling cavity 115 is then filled with a resin through the injection bore 114. When the molding of the lens holder 30 and actuator base 40 is completed with the resin hardened, the metal mold is disassembled in a procedure opposite to the above-described metal mold assembling procedure. During this time, the left and right movable mold members 111, 112 are removed by sliding the same in the leftward and rightward directions. The left and right movable mold members 111, 112 are fixed once in the leftwardly and rightwardly slid state, and a damping agent made of an ultraviolet ray setting resin is applied to the surfaces of the grooves 43a, 43b formed in both side portions of the actuator base 40, the movable mold members 111, 112 being thereafter removed. FIG. 13 shows the condition of a product removed from this metal mold, i.e., a product in which the lens holder 30 and actuator base 40 are made integral on the upper and lower suspension frames 70, 90, and in which plurality of suspension units 120 in a ladder-like arrangement are formed, is completed. The above is a description of a second step of the actuator unit manufacturing method.

Figure 14:
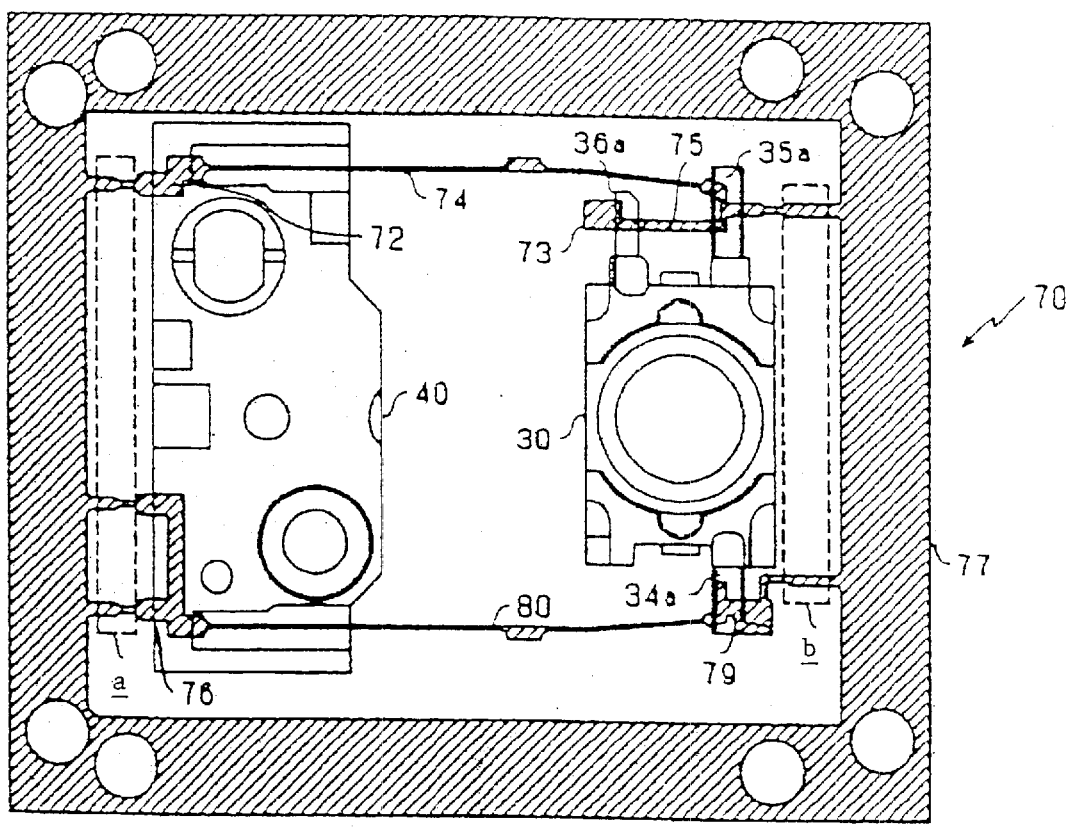
FIG. 14 shows a cut portion of an upper suspension frame with a lens holder and a suspension base made integral with each other.
Figure 15:
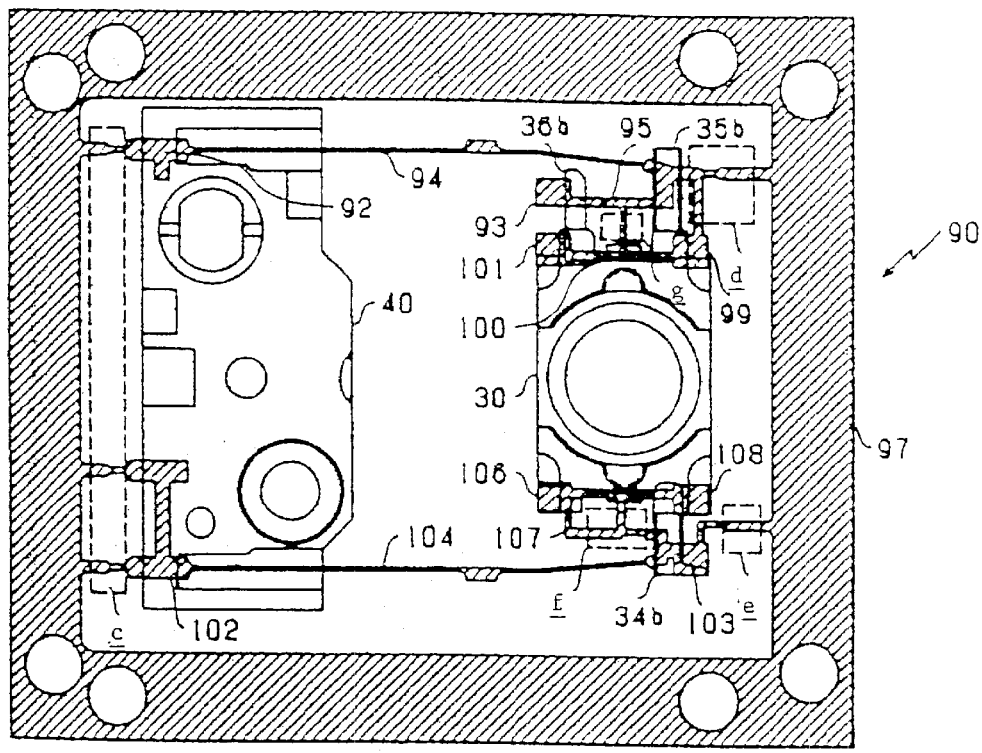
FIG. 15 shows a cut portion of a lower suspension frame with a lens holder and a suspension base made integral with each other.

Before a third step of the actuator unit manufacturing method, in which the terminal parts of the printed board A coil 50 and printed board B coil 60 (which will hereinafter be referred to as two printed board coils 50, 60) fixed to the lens holder 30, four wire-form elastic members 74, 80, 94, 104 fixed to the lens holder 30, and connecting parts are connected together is described, a step provided for cutting off adjacent frame members 77, 97 of the upper and lower suspension frames 70, 90 and other unnecessary members will be described below with reference to FIGS. 14 and 15. FIG. 14 is a plan view in section showing the condition in which the lens holder 30 and actuator base 40 are molded in an integral state on the upper suspension frame 70. The lens holder 30 has a pair of left and right fixing arms 34a, 35a and a projection 36a formed on the top plate 31 side. As shown in FIG. 14, the outer circumferential A wire 74, inner circumferential A wire 80 and various connecting members are fixed with the parts of the wires 74, 80 and connecting members buried in the resin and free end portions of the connecting parts exposed to the outside of the resin. FIG. 15 is a plan view in section showing the condition in which the lens holder 30 and actuator base 40 are molded in an integral state on the lower suspension frame 90. The lens holder 30 has a pair of left and right fixing arms 34b, 35b and projection 36b formed on the bottom plate 33. As shown in FIG. 15, the outer circumferential B wire 94, inner circumferential B wire 104 and various connecting members are fixed with the parts of the wires 94, 104 and connecting members buried in the resin and free end portions of the connecting parts exposed to the outside of the resin.

The upper suspension frame 70 and lower suspension frame 90 are removed at the portions thereof which are shown by frames of broken lines in the drawings, whereby these frames 70, 90 are separated from the frame members 77, 97 with the lens holder 30 and actuator base 40 connected to the four wire-form elastic members 74, 80, 94, 104, to obtain the suspension unit 120.

As shown in FIG. 14, the suspension frame 70 is removed by laser cutting or punching two portions shown by frames of broken lines a and b. The outer circumferential A wire 74 molded with the actuator base 40 in an integral state and connected to the tracking input terminal 72 cut off from the frame member 77 is cut off from the frame member 77 and fixed to the fixing arm 35a of the lens holder 30, and the tracking A input connecting part 73 joined to the wire 74 by the A connecting member 75 is fixed to the projection 36a with the connecting part 73 exposed to the outside of a front side surface of the lens holder 30. The inner circumferential A wire 80 molded with the suspension base 40 in an integral state and joined to the tracking output terminal 78 cut off from the frame member 77 is fixed to the fixing arm 34a of the lens holder 30 cut off from the frame member 77, the tracking B output connecting part 79 joined to the inner circumferential A wire 80 being fixed with the connecting part 79 exposed to the outside of a rear surface of the lens holder 30.

As shown in FIG. 15, the lower suspension frame 90 is removed in the same method at five portions shown by frames of broken lines c–f. The outer circumferential B wire 94 molded with the actuator base 40 in an integral state and connected to the focusing input terminal 92 cut off from the frame member 97 is cut off from the frame member 97 and fixed to the fixing arm 35b of the lens holder 30, and the focusing A input connecting part 93 joined to the wire 94 by the B connecting member 95 is fixed to the projection 36b with the connecting part 93 exposed to the outside of the front surface of the lens holder 30. The focusing B input connecting part 99 cut off from the outer circumferential B wire 94 is fixed with the connecting part 99 exposed to the outside of the rear surface of the lens holder 30, and the focusing B output connecting part 101 joined to the wire 94 by the focus B input connecting part 99 and D coupling member 100 is fixed with the connecting part 101 exposed to the outside of the front surface of the lens holder 30.

The inner circumferential B wire 104 molded with the actuator base 40 in an integral state and joined to the focusing output terminal 102 cut off from the frame member 97 is fixed to the fixing arm 34b of the lens holder 30 cut off from the frame member 97, and the focus B output connecting part 103 joined to the inner circumferential B wire 104 is fixed with the connecting part 103 exposed to the outside of the rear surface of the lens holder 30. The tracking B input connecting part 108 cut off from the frame member 97 is fixed with the connecting part 108 exposed to the outside of the rear surface of the lens holder 30, and the tracking A output connecting part 106 connected to the wire 104 by the tracking B input connecting part 108 and F coupling member 107 is fixed with the connecting part 106 exposed to the outside of the front surface of the lens holder 30.

A method, which constitutes the above-mentioned third step of the actuator unit manufacturing unit, of connecting the lens holder 30 and two printed board coils 50, 60 together will now be described with reference to FIG. 16. In order to have the construction of parts to be soldered understood easily, the printed board A coil 50 and printed board B coil 60 in FIG. 16 are shown disposed in positions away from both side surfaces of the lens holder 30, and the connecting parts molded with the lens holder 30 in an integral state are shown schematically (portions shown by broken lines in the drawing) in an extended state.

The connecting parts of the lens holder 30 containing the objective lens 37 therein have positional relation in which these connecting parts contact the terminal parts formed on the printed board A coil 50 and printed board B coil 60 with the coils 50, 60 fixed in predetermined positions in the lens holder 30.

Figure 16:
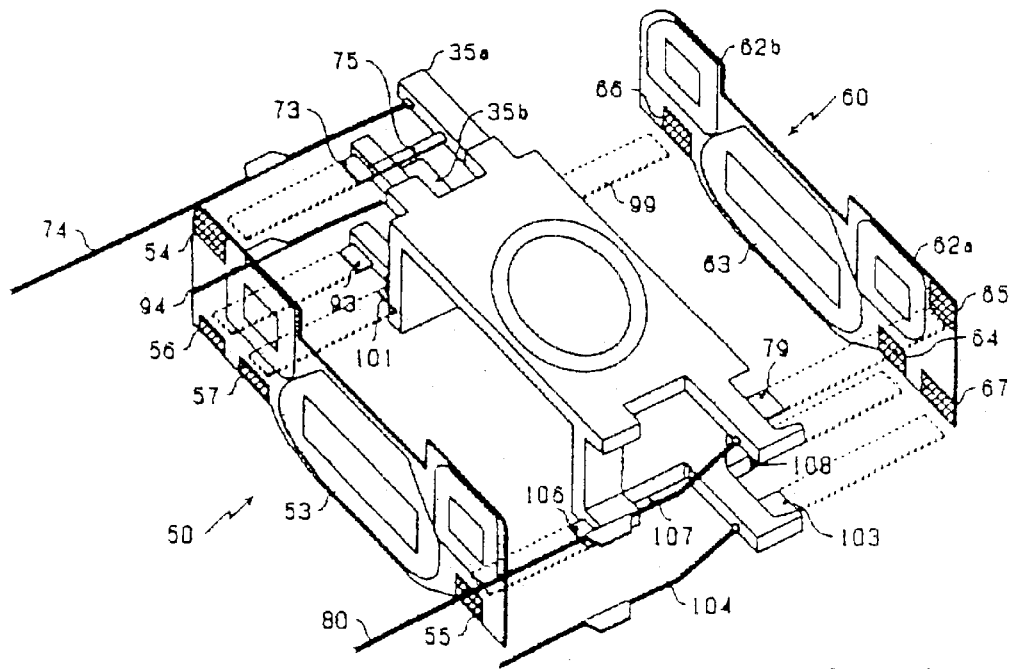
FIG. 16 is a perspective view showing a structure in which a printed board coil is connected to a suspension unit.

To be concrete, the four terminal parts (tracking A input terminal part 54, tracking A output terminal part 55, focusing A input terminal part 56 and focusing A output terminal part 57) of the printed board A coil 50 have positional relation in which these terminal parts contact end surfaces of the four connecting parts (tracking A input connecting part 73, focusing A input connecting part 93, focusing B output connecting part 101 and tracking A output connecting part 106) as shown in FIG. 16 which are formed so as to be exposed to the outside of the front surface of the lens holder 30 with these connecting parts fixed to predetermined positions on the front surface of the lens holder 30. The four terminal parts (tracking B input terminal part 64, tracking B output terminal part 65, focusing B input terminal part 66 and focusing B output terminal part 67) of the printed board B coil 60 have positional relation in which these terminal parts contact the end surfaces of the four connecting parts (tracking B output connecting part 79, focusing B input connecting part 99, focusing B output connecting part 103 and tracking B input connecting part 108) formed so as to be exposed to the outside of the rear surface of the lens holder 30. Therefore, the actuator unit 140 is formed by soldering these parts together.

The outer circumferential A wire 74 connected to the tracking input terminal 72 is connected to the tracking A input terminal part 54 via the A coupling member 75, and the tracking A input terminal part 54 is soldered to the tracking A input terminal part 54 of the printed board A coil 50. The tracking A output terminal part 55 of the printed board A coil 50 is soldered to the tracking A output connecting part 106 of the lens holder 30, while the tracking B input connecting part 108 of the lens holder 30 joined to the tracking A output connecting part 106 by the F coupling member 107 is soldered to the tracking B input terminal part 64 of the printed board B coil 60. The inner circumferential A wire 80 connected to the tracking output terminal 78 is connected to the tracking B output connecting part 79, and the tracking B output connecting part 79 is soldered to the tracking B output terminal part 65 of the printed board B coil 60.

As mentioned above, the tracking A coil 52a and tracking B coil 52b of the printed board A coil 50 are series-connected between the tracking A input terminal part 54 and tracking A output terminal part 55, while the tracking C coil 62a and tracking D coil 62b of the printed board B coil 60 are series-connected between the tracking B input terminal part 64 and tracking B output terminal part 65. Accordingly, four tracking coils 52a, 52b, 62a, 62b are put in a series-connected state between the tracking input terminal 72 and tracking output terminal 78.

The outer circumferential B wire 94 connected to the focusing input terminal 92 is connected to the focusing A input connecting part 93 via the B coupling member 95, and the focusing A input connecting part 93 is soldered to the focusing A input terminal part 56 of the printed board A coil 50. The focusing A output terminal part 57 of the printed board A coil 50 is soldered to the focusing A output connecting part 101 of the lens holder 30, while the focusing B input connecting part 99 of the lens holder 30 joined to the tracking A output connecting part 101 by the C coupling member 100 is soldered to the focusing B input terminal part 66 of the printed board B coil 60. The inner circumferential B wire 104 connected to the focusing output terminal 102 is joined to the focusing B output connecting part 103, and the focusing B output connecting part 103 is soldered to the focusing B output terminal part 67 of the printed board B coil 60.

As mentioned above, the focusing A coil 53 of the printed board A coil 50 is connected between the focusing A input terminal part 56 and focusing A output terminal part 57, and the focusing B coil 63 of the printed board B coil 60 between the focusing B input terminal part 66 and focusing B output terminal part 67. Therefore, the focusing A coil 53 and focusing B coil 63 are put in a series-connected state between the focusing input terminal 92 and focusing output terminal 102.

The above is a description of the third step of the actuator unit manufacturing method. As described above, in the actuator unit 140 used in the mode of embodiment of the pickup apparatus 200 according to the present invention, the four wire-form elastic members 74, 80, 94, 104 are molded with the lens holder 30 and actuator base 40 in an integral state, while the connecting parts for connecting printed board A coil 50 and printed board B coil 60 together are molded in an integral state, whereby it is rendered unnecessary to carry out the connection of the parts on the outer side of the actuator unit by using a wiring material. Accordingly, the working step can be simplified and the actuator unit 140 having high reliability can be obtained.

Figure 17A:
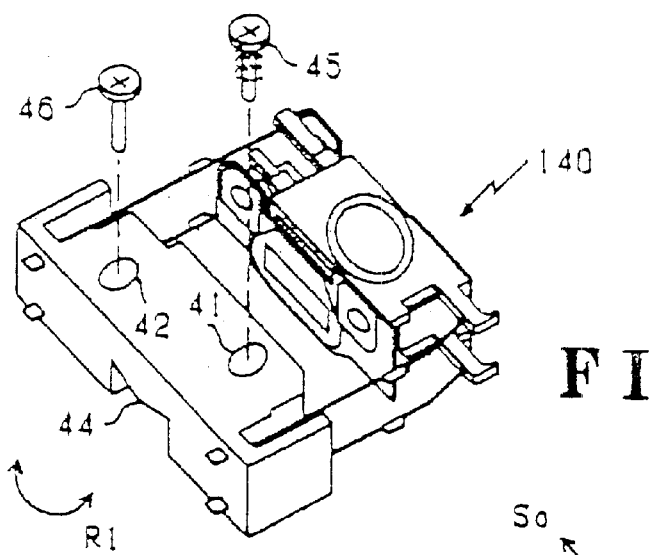
FIGS. 17A–17C are drawings showing a procedure for installing an actuator unit on a suspension base.

The procedure for installing the actuator unit 140 on the suspension base 150 will now be described with reference to FIGS. 17A–17C. FIG. 17A is a perspective view of the actuator unit 140, FIG. 17B a perspective view of the stopper member 157, and FIG. 17C a perspective view of the actuator base 150.

As described above, the actuator unit 140 is fixed after fitting the V-shaped recess 44 thereof on two M-shaped projections 155 of the suspension base 150, and then regulating the posture of the actuator unit by the spring-carrying screw 45 and fixing screw 46. Consequently, the movable unit 130 is supported movably with a predetermined width of magnetic space formed with respect to a pair of magnets 151. The stopper member 157 is then inserted into the insert holes 154 of a pair of standing portions 153 provided on the suspension base 150 so as to surround the movable unit 130.

Figure 17B:
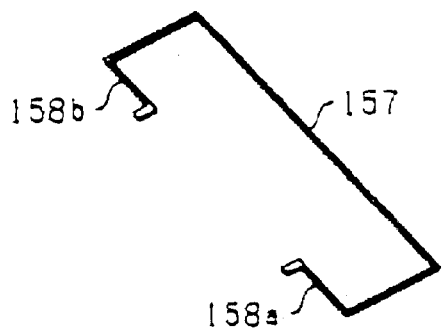
Figure 17C:
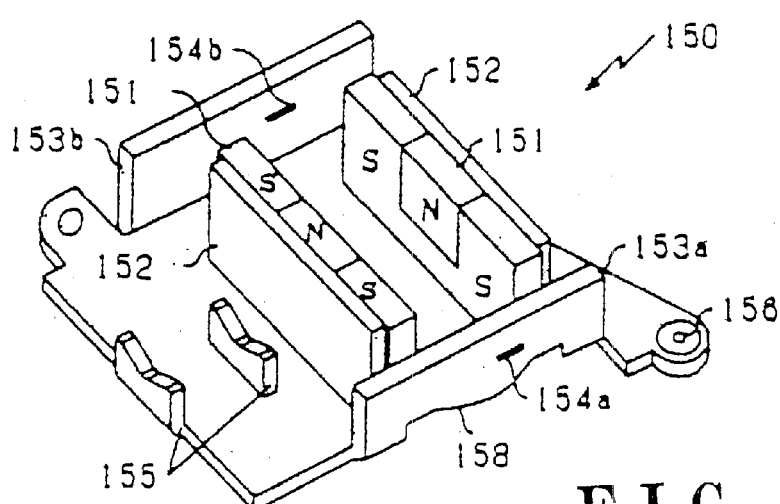

As shown in FIG. 17B, the stopper member 157 is a wire-form member bent in its entirety substantially in the shape of an angular "C", and free end parts of the C-shaped body are provided with blocking portions 158a, 158b projecting toward inner portions of the standing portions 153, i.e., toward the movable unit 130. The stopper member 157 is inserted into the insert holes 154 of the standing portions 153 at the free end parts of the two blocking portions 158a, 158b thereof from the outer side of the standing portions 153. Therefore, the stopper member 157 is made of elastic members having an effect of a spring.

In the actuator unit 140 placed on the suspension base 150, the range of a movement of the movable unit 130 in the tracking direction is restricted by the two standing portions 153 provided so as to surround the movable unit 130, and also the range of a movement of the movable unit 130 in the focusing direction by the stopper member 157.

Figure 18A:
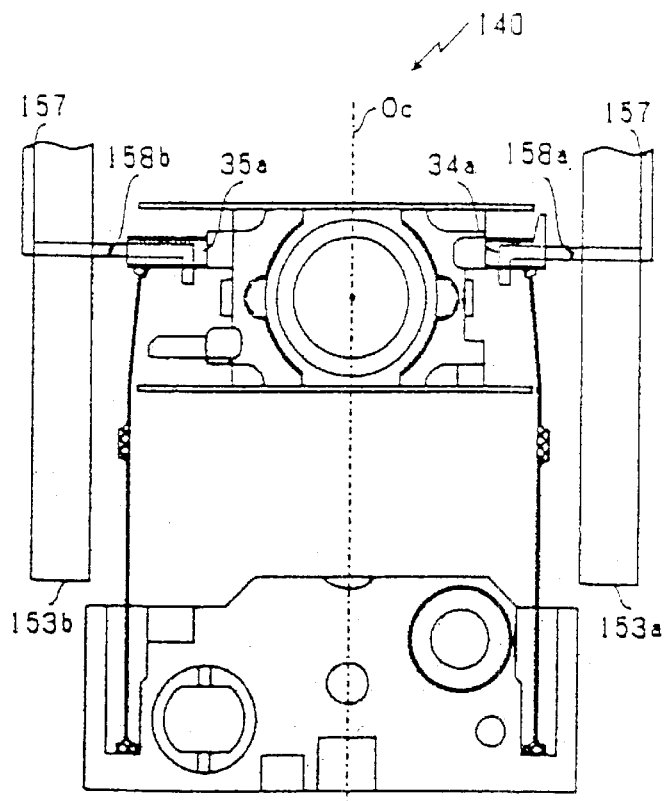
FIGS. 18A–18B illustrate the function of stopper members.

This structure will be described concretely with reference to FIGS. 18A and 18b. FIG. 18A is a plan view showing the positional relation among the actuator unit 140, the standing portions 153 of suspension base 150 and stopper member 157, and FIG. 18B a side view showing the positional relation among the lens holder 30 containing the objective lens 37 therein, standing portions 153 and stopper member 157.

Figure 18B:
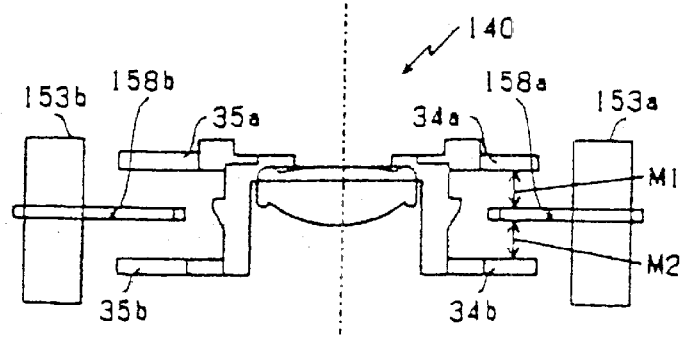

As shown in FIGS. 18A and 18B, when the stopper member 157 is inserted into the insert holes 154 of the standing portions 153, one blocking portion 158a of the stopper member 157 is positioned substantially halfway between one pair of fixing arms 34a, 34b formed on the lens holder 30 so that these fixing arms are away from each other in the focusing direction, while the other blocking portion 158b of the stopper member 157 is positioned substantially halfway between the other pair of fixing arms 35a, 35b formed on the lens holder 30 so that these fixing arms are away from each other in the focusing direction. Accordingly, when the movable unit 130 is driven upward in the focusing direction, the range of the movements of the left and right fixing arms 34b, 35b formed on the bottom wall 33 of the lens holder 30 is restricted within a distance M2 between positions in which the arms 34b, 35b start being moved and positions in which the same arms engage the blocking portions 158a, 158b. When the movable unit 130 is driven downward in the focusing direction, the range of the movements of the left and right fixing arms 34a, 35a formed on the top plate 31 of the lens holder 30 is restricted within a distance M1 between positions in which the arms 34a, 35a start being moved and positions in which the same arms engage the blocking portions 158a, 158b. Since the fixing arms 35a, 35b formed of the fixing portions of the elastic members are thus utilized as structures for restricting the movement of the movable unit in the focusing direction, the reduction of the manufacturing cost is attained.

Figure 19:
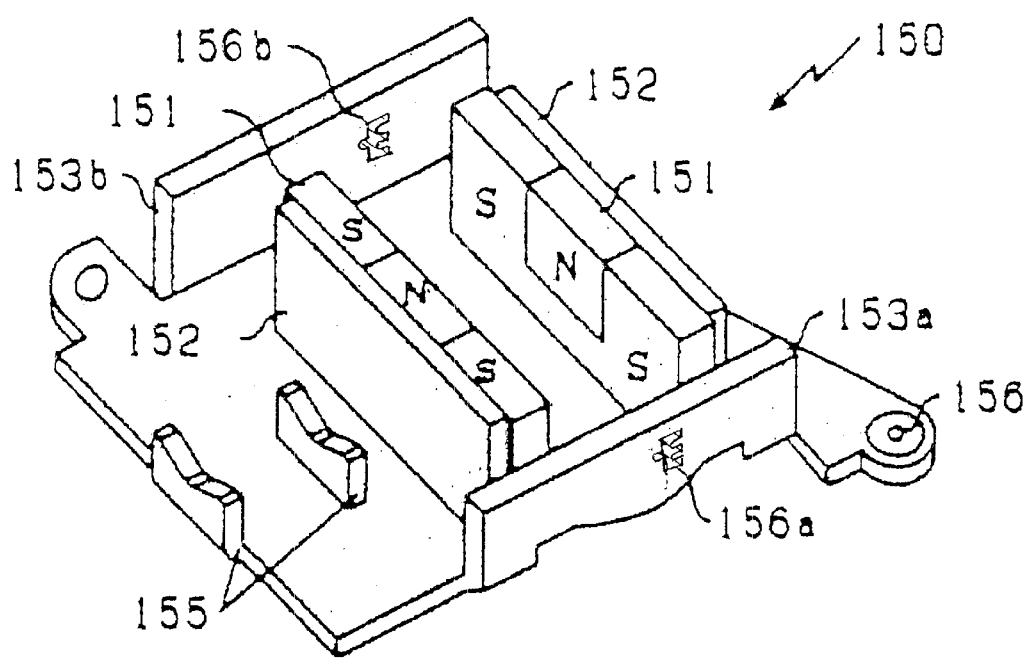
FIG. 19 is a drawing showing another example of the suspension base.

The insert holes 154 made in the standing portions 153 may be formed of a pair of insert holes 156a, 156b in which plurality of inserting positions are provided as shown in FIG. 19. Owing to the insert holes thus formed, it becomes possible to restrict differently the range of the upward movement of the movable unit 130 and that of the downward movement thereof, whereby the capability of using the suspension base 150 for multiple purposes increases.

As described above, the actuator unit 140 is fixed to the suspension base 150, and the stopper member 157 is thereafter inserted into the insert holes 154 of the standing portions 153. The suspension base 150 is then fixed to the pickup body 170 to complete the mode of embodiment of the pickup apparatus 200 according to the present invention. As described above, in the movable unit 130 constituting the pickup apparatus 200, a mode of embodiment of the present invention, the range of the movement thereof in the tracking direction is restricted by the standing portions 153 of the suspension base 150, and that of the movement thereof in the focusing direction by the stopper member 157. Therefore, the mode of embodiment of the pickup apparatus 200 according to the present invention does not need an actuator cover, and enables the reduction of the dimensions and weight thereof to be attained.

Figure 20:
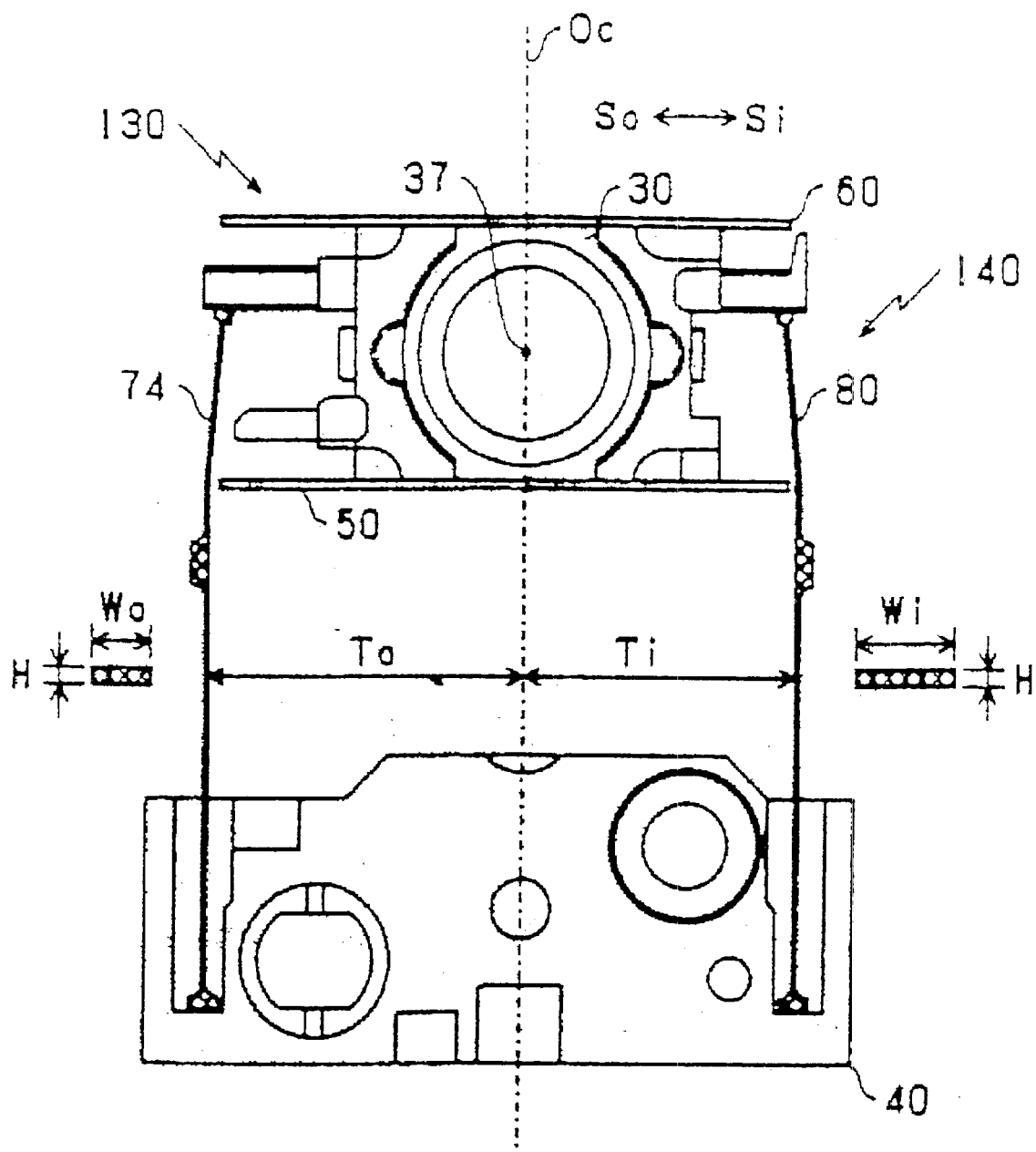
FIG. 20 illustrates the suppressing of an angular moment.
Figure 21:
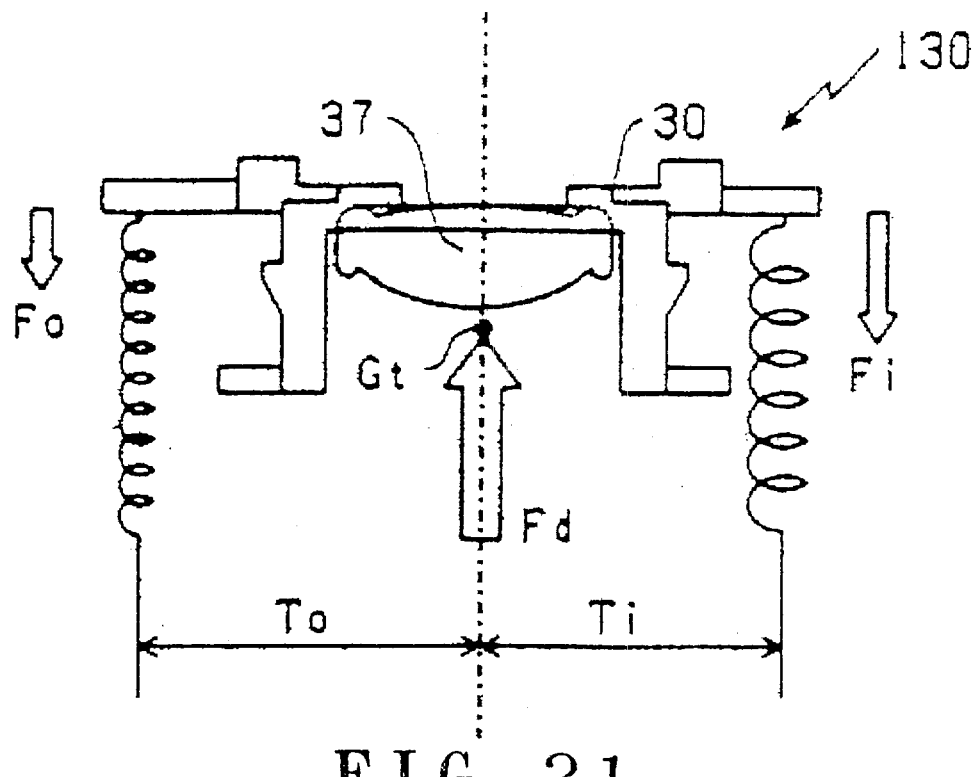
FIG. 21 illustrates the suppressing of an angular moment.

The construction of the four wire-form elastic members 74, 94, 80, 104 supporting the movable unit 130, and an operation for preventing the rolling of the movable unit 130 will now be described with reference to FIGS. 20 and 21. Although the movable unit 130 is supported on the four wire-form elastic members 74, 94, 80, 104 in practice, the outer circumferential A wire 74 and inner circumferential A wire 80 only are shown in the drawing so as to avoid the complication of a description. This does not cause differences to occur in the description of the operations. FIG. 20 is a plan view of the actuator unit 140, and FIG. 21 a schematic diagram describing the rotational moment of the movable unit 130. As described above, the pickup apparatus 200 constituting the mode of embodiment of the present invention is formed so that the distance Ti between the inner circumferential A wire 80 supporting the movable unit 130 and the optical center line Oc of the objective lens 37 is smaller than that To between the outer circumferential A wire 74 and the same optical center line Oc as shown in FIG. 20. Although the inner circumferential A wire 80 and outer circumferential A wire 74 are formed to the same thickness H, the width Wi of the inner circumferential A wire 80 is set larger (Wi>Wo) than that Wo of the outer circumferential A wire 74.

Therefore, a spring constant Ki of the inner circumferential A wire 80 is represented by the following expression (1):

$$Ki\ T^3 H \qquad (1)$$

Similarly, a spring constant Ko of the outer circumferential A wire 74 is represented by the following expression (2):

$$K_o T_o^3 H \quad (2)$$

Accordingly, in view of the above-mentioned relation Wi>Wo, the spring constant Ki of the inner circumferential A wire 80 becomes larger than that Ko of the outer circumferential A wire 74 (Ki>Ko).

Let x equal an amount of flexure in the focusing direction of the inner circumferential A wire 80 and outer circumferential A wire 74 which are displaced in the focusing direction by a driving force Fd of the movable unit 130. When the movable unit 130 is displaced in the focusing direction as shown in FIG. 20, a restoring force Fi of the inner circumferential A wire 80 is represented by the following equation (3):

$$Fi = Kix \quad (3)$$

Similarly, a restoring force Fo of the outer circumferential A wire 74 is represented by the following equation (4):

$$Fo = Kox \quad (4)$$

Accordingly, in view of the above-mentioned relation Ki>Ko, the restoring force Fi of the inner circumferential A wire 80 becomes larger (Fi>Fo) than that Fo of the outer circumferential A wire 74.

The rotational moment of the movable unit 130 is determined by a product obtained by multiplying a distance between the center of gravity Gt (a point of application of a focus driving force and the center of gravity of the movable unit 130 are on the optical axis La) of the movable unit 130 and springs (inner circumferential A wire 80 and outer circumferential A wire 74) by a restoring force in a position in which the springs (inner circumferential A wire 80 and outer circumferential A wire 74) are fixed. Accordingly, when a rotational moment of the restoring force Fi of the inner circumferential A wire 80 and that Fo of the outer circumferential A wire 74 are balanced with each other, the rotational moment becomes zero, and the movable unit 130 is not turned.

In view of the above, the plate width Wi of the inner circumferential A wire 80 and that Wo of the outer circumferential A wire 74 are set so as to have the relation represented by the following equation (5):

$$FiTi = FoTo \quad (5)$$

Figure 22:
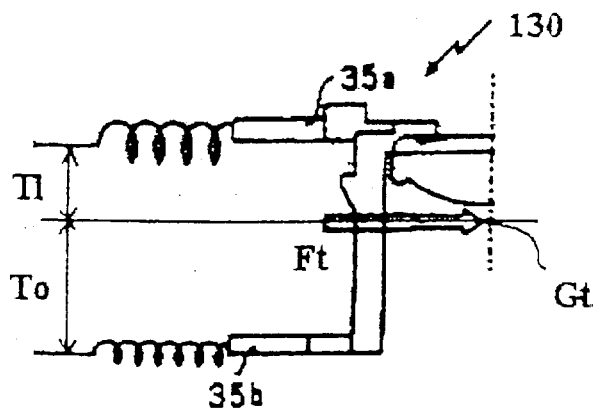
FIG. 22 illustrates the suppressing of an angular moment.

As described above, in the pickup apparatus 200 constituting the mode of embodiment of the present invention, the distance Ti between the inner circumferential A wires 80, 104 which support the movable unit 130 and the optical center line Oc of the objective lens 37 is set smaller than that To between the outer circumferential wires 74, 94 and the same optical center line Oc, and the plate width Wi of the inner circumferential wires 80, 104 is set larger than that Wo of the outer circumferential wires 74, 94. This enables the inner circumferential portion of the actuator unit 140, i.e. the portion thereof which is on the side of the spindle motor 180 is formed to smaller dimensions than the outer circumferential portion thereof without causing the rotational moment, to which the rolling of the movable unit 130 is ascribed, of the movable unit 130 to occur, and the objective lens to be positioned closer to the inner circumferential portion of the optical disk. The setting of the spring constants of the wire-form elastic members 74, 94, 80, 104 different in this manner is not always done in the inner and outer circumferential portions of the actuator unit. The spring constants can also be set different between the upper wire-form elastic members 74, 80 and the lower wire-form elastic members 94, 104 in the focusing direction. Namely, as described above, in order to hold down the occurrence of a rotational moment due to the restoring force of the springs when the center of gravity Gt is driven in the tracking direction by a driving force Ft with the distance Ti between the center of gravity Gt of the movable unit 130 and the upper wire-form elastic members 74, 80 and that To between the center of gravity Gt and the lower wire-form elastic members 94, 104 different as shown in FIG. 22, the spring constant of the upper wire-form elastic members 74, 80 and that of the lower wire-form elastic members 94, 104 may be set suitably so that the above equation (4) is established.

It is not always necessary that the setting of the spring constants be done so as to establish the above equation (4). Setting the spring constants differently so that a rotational moment imparted to the movable unit decreases can contribute to the prevention of the rolling of the movable unit as compared with setting all spring constants equal.

Figure 23:
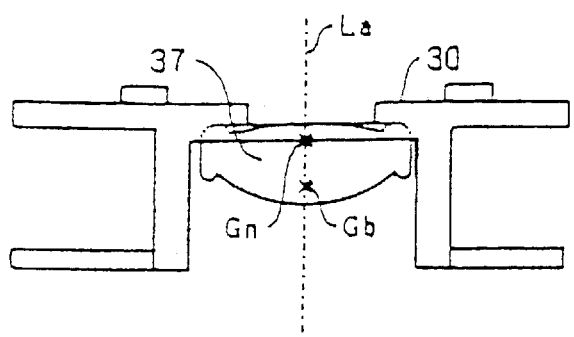
FIG. 23 illustrates the relation between a printed board coil and a counterweight.
Figure 24:
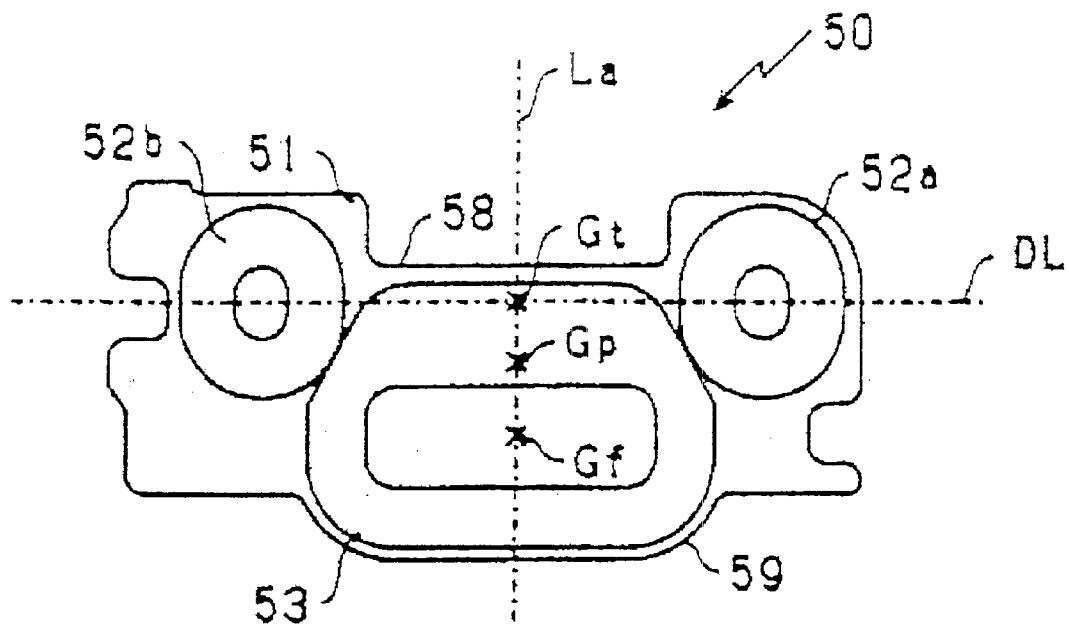
FIG. 24 illustrates the relation between a printed board coil and a counterweight.

The center of gravity of the movable unit 130 will now be described with reference to FIGS. 23–26. In the movable unit 130, the printed board A coil 50 and printed board coil 60 are fixed practically. However, since the base plates 51, 61 of the printed board A coil 50 and printed board coil 60 are formed to the same shape, it can be conceived that these base plates are in the same weight position. Accordingly, FIGS. 23–26 show the printed board A coil 50 alone so as to avoid the complication of a description. FIG. 23 is a diagram showing the center of gravity of the movable unit in which the objective lens 37 is installed in the lens holder 30, FIG. 24 a diagram showing the center of gravity of the printed board coil 50, and FIG. 25 a diagram showing the center of gravity of the movable unit 130. FIG. 24 shows an example in which the focusing A coil 53 is provided in a further low position.

The lens holder 30 is a substantially square member of a resin-molded hollow structure as mentioned above, and has a top plate 31. Therefore, the center of gravity of the lens holder 30 is in a position of Gb in the drawing which is closer to the top plate 31 than to the center of the lens holder 30 as shown in FIG. 23. When the objective lens 37 is installed in the lens holder 30, the center of gravity of the lens holder 30 is shifted to a position indicated by Gn in the drawing which is further closer to the top plate 31. As shown in FIG. 24, the printed board coil 50 is provided in the region thereof which is between the tracking A coil 52a and tracking B coil 52b with a recess 58 in the upper portion of the base plate 51, and a projection 59 in the bottom portion thereof. The printed board A coil 50 is provided with the tracking A coil 52a and tracking B coil 52b which are symmetric with respect to the optical axis La. Therefore, the center of gravity of the tracking A coil 52a and tracking B coil 52b is in a position which is indicated by Gt shown in the drawing, and which constitutes an intersection of a line of action DL of the tracking driving force, which connects the centers of the two tracking coils 52a, 52b, and optical axis La. The center of gravity of the focusing A coil 53 is in the center thereof, i.e. a position shown by Gf in the drawing which is on the optical axis La. Consequently, the center of gravity of the printed board coil 50 is in a position shown by Gp in the drawing which is lower than the center of gravity Gt of the two tracking coils 52a, 52b and higher than the center of gravity Gf of the focusing A coil 53.

Figure 25:
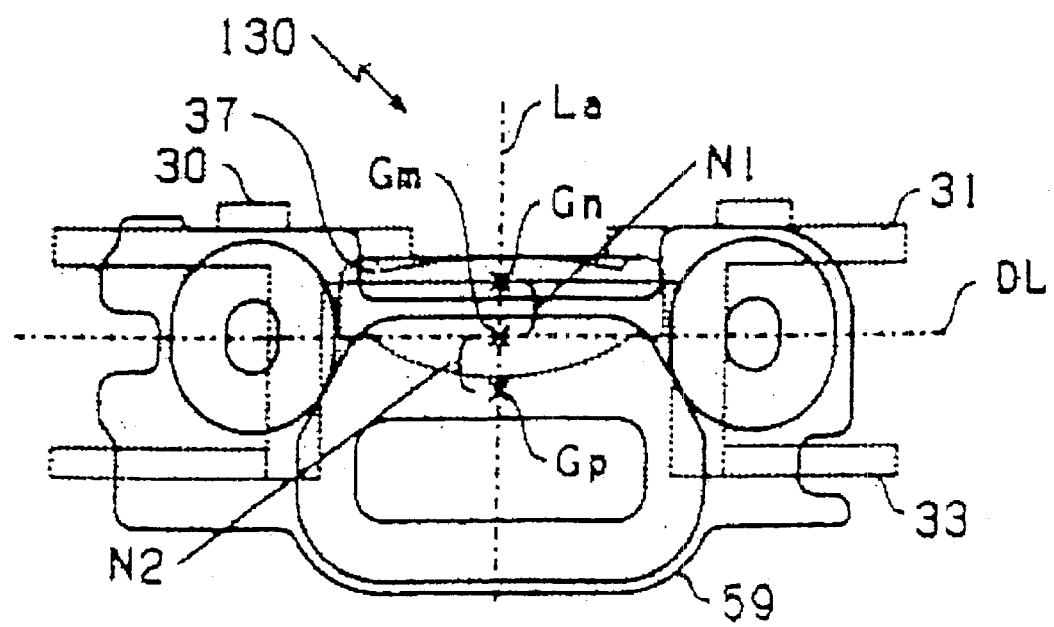
FIG. 25 illustrates the relation between a printed board coil and a counterweight.

FIG. 25 shows the condition in which the printed board A coil 50 is fixed to the lens holder 37. When the printed board A coil 50 is fixed in a position in which the top wall 31 of the lens holder 30 and that of the base plate 51 form a straight line, the projection 59 of the printed board A coil 50 is put in a downwardly extending state with respect to the bottom wall 33 of the lens holder 30.

When a distance N1 between the center of gravity Gn of the lens holder 30 having the objective lens 37 therein and the line of action DL of the tracking driving force, and a distance N2 between the center of gravity Gp of the printed board A coil 50 and the line of action DL of the tracking driving force are equal to each other with the printed board A coil 50 fixed to the lens holder 37 having the objective lens 37 therein, the center of gravity Gm of the movable unit 130 is positioned on the optical axis La of the objective lens 37 and on the line of action DL of the tracking driving force.

Accordingly, when the sizes of the recess 58 and projection 59 of the printed board A coil 50 are set during the designing of the base plate 51 so that the distance N1 between the line connecting the center of gravity Gn of the lens holder 30 having the objective lens 37 therein and the line connecting the tracking coils 52a, 52b together, i.e. the line of action DL of the tracking driving force and the distance N2 between the center of gravity Gp of the printed board A coil 50 and the line of action DL become equal to each other, the center of gravity of the movable unit 130 can be set to the intersection of the line of action DL of the tracking driving force and the optical axis La. This can prevent the occurrence of a rotational moment when the movable unit 130 is driven in the tracking direction. Since the weight of the focusing coil 53 can be used as a counterweight in this mode of embodiment, the weight of the movable unit 130 does not increase as compared with a movable unit using a special counterweight, and the ill influence of the rotational moment can be avoided.

The recess 58 formed in an upper portion of the base plate 51 enables the center of gravity of the printed board A coil 50 to be raised, and the distance between the line of action DL of the two tracking coils 52a, 52b and the center of gravity Gp of the printed board A coil 50, i.e. the distance N2 to increase. Consequently, a weight effect of the focusing coil as a counterweight becomes large. Namely, providing the recess 58 in the base plate 51 enables the weight of the focusing coil as a counterweight to be virtually increased without causing a total weight of the movable unit 130 to increase. As a result, a margin of an increase in the weight of the objective lens 37 increases, and the capability of the apparatus of being used for multiple purposes is improved.

Figure 26:
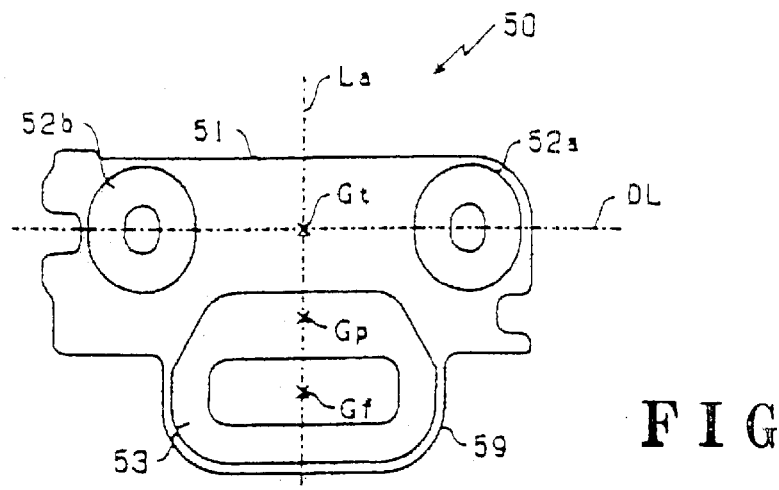
FIG. 26 shows another example of the printed board coil.

The printed board A coil 50 may also be formed so that the focusing A coil 53 is in a further lower position as shown in FIG. 26. When the printed board A coil 50 is thus formed, the center of gravity Gf of the focusing A coil 53 is positioned lower than that in the example shown in FIG. 24, so that the center of gravity Gp of the printed board A coil 50 is also shifted to a lower position. However, in such a structure, the weight of the base plate 51 becomes larger than that in the example shown in FIG. 22, and the projection 59 of the base plate 51 becomes large to limit the range of a movement of the movable unit 130 in the downward focusing direction. Therefore, the shape of the printed board A coil 50 is set in accordance with the position of the center of gravity of the lens holder 30 having the objective lens 37 therein.

Figure 27:
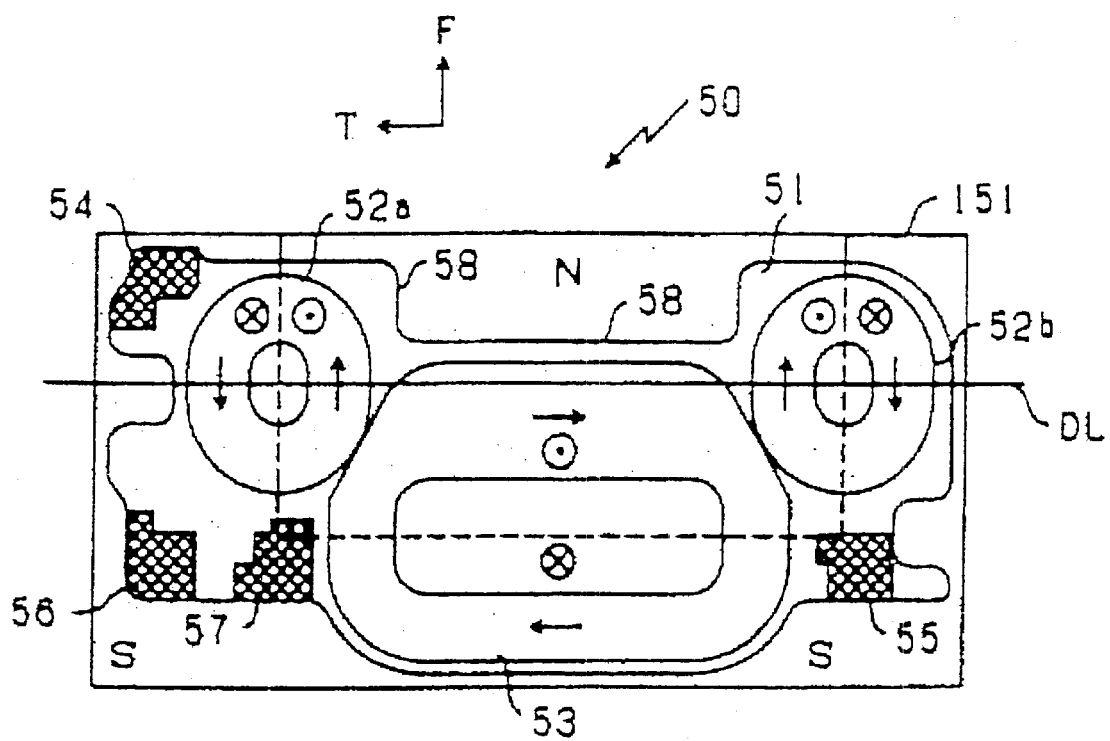
FIG. 27 is a drawing describing focusing and tracking driving power.

The operation of the movable unit of the pickup apparatus 200 constituting the embodiment of the present invention will now be described with reference to FIG. 27. FIG. 27 is a drawing showing the relative positional relation between the printed board A coil 50 and magnet 151 with the movable unit 130 in a regular position.

The magnet 151 is a multipolar magnetized magnet in which, for example, an N-pole is magnetized substantially squarely in a central portion thereof with a substantially U-shaped S-pole magnetized so as to surround three sides of the N-pole. A magnetized region of the N-pole is perpendicular to the surface of the drawing, and generates a magnetic flux directed from a rear side to a front side of the drawing and that of the S-pole is perpendicular to the surface of the drawing, and generates a magnetic flux directed from a front side to a rear side of the drawing. As shown in FIG. 27, the coils formed on the printed board A coil 50 are arranged so that the central portions of the coils are positioned on a boundary line between the N-pole and S-pole of the magnet 151.

When a tracking driving current is supplied between the tracking input terminal part 54 and tracking output terminal part 55, so that the current flows through the tracking A coil 52a and tracking B coil 52b in the directions shown by arrows in the drawing, a leftward tracking driving force shown by an arrow T in the drawing occurs. When a driving current flowing in the direction opposite to the mentioned direction is supplied, a rightward (opposite to the direction of the arrow T in the drawing) tracking driving force occurs.

When a focusing driving current is supplied to the focusing input terminal part 56 and focusing output terminal part 57, so that the current flows through the focusing coil 53 in the direction shown in the drawing, an upward focusing driving force shown by an arrow F in the drawing occurs. Similarly, when a driving current flowing in the direction opposite to the mentioned direction is supplied, a downward (opposite to the direction of the focusing driving force shown by an arrow F in the drawing) focusing driving force occurs.

According to the present invention, the stopper members for restricting the range of a movement in the focusing direction of the lens holder are positioned between a pair of elastic member-fixing parts projecting from the portions of the lens holder which are spaced from each other in the focusing direction. This enables the actuator cover to be omitted, and a pickup apparatus of reduced dimensions and weight to be provided.

What is claimed is:

1. A pickup apparatus comprising a lens holder, and an actuator base, which are connected together via plurality of elastic members to thereby support the lens holder movably,
   the lens holder having on both sides thereof a pair of elastic member-fixing parts which project from such portions thereof that are spaced from each other in a focusing direction, and which have a pair of elastic members fixed thereto respectively, and a stopper member positioned between the two elastic member-fixing parts and restricting a range of a movement of the lens holder in the focusing direction, wherein a distance, from a center of said lens holder to which an optical axis of a lens is aligned, to positions of said pair of elastic member-fixing parts at which said pair of elastic members are fixed respectively is made different between both sides of said lens holder.

2. A pickup apparatus comprising a lens holder, and an actuator base, which are connected together via plurality of wire-form elastic members to thereby support the lens holder movably in a focusing direction and a tracking direction, the lens holder having on both sides thereof a pair of elastic member-fixing parts which project from such portions thereof that are spaced from each other in the focusing direction, and which have a pair of wire-form elastic members fixed thereto respectively, the actuator base having a pair of standing portions which are provided in positions spaced from each other in the tracking direction with the lens holder held therebetween, and which are adapted to restrict a range of a movement of the lens holder in the tracking direction, and stopper members which project from the standing portions so as to be positioned between the two elastic member-fixing parts, and which are adapted to restrict a range of a movement of the lens holder in the focusing direction, wherein a distance, from a center of said lens holder to which an optical axis of a lens is aligned, to positions of said pair of elastic member-fixing parts at which said pair of wire-form elastic members are fixed respectively is made different between both sides of said lens holder.

3. A pickup apparatus comprising a lens holder, and a suspension base, which are molded in an integral state between both ends of plurality of wire-form elastic members, the suspension base being fixed to an actuator base, whereby the lens holder is supported so as to be movable in a focusing direction and a tracking direction, the lens holder having on both sides thereof a pair of elastic member-fixing parts which project from such portions thereof that are spaced from each other in a focusing direction, and which have a pair of elastic members fixed thereto respectively, the actuator base having a pair of standing portions which are provided in positions spaced from each other in the tracking direction with the lens holder held therebetween, and which are adapted to restrict a range of a movement of the lens holder in the tracking direction, and stopper members which project from the standing portions so as to be positioned between the two elastic member-fixing parts, and which are adapted to restrict a range of a movement of the lens holder in the focusing direction, wherein a distance, from a center of said lens holder to which an optical axis of a lens is aligned, to positions of said pair of elastic member-fixing parts at which said pair of elastic members are fixed respectively is made of different between both sides of said lens holder.

4. A method of manufacturing a pickup apparatus, in which a lens holder and a suspension base are connected together via plurality of wire-form elastic members, the suspension base being fixed to an actuator base, the lens holder including on both sides thereof a pair of fixing parts which project from such portions thereof that are spaced from each other in a focusing direction, and which have the wire-form elastic members fixed thereto respectively, wherein a distance, from a center of said lens holder to which an optical axis of a lens is aligned, to positions of said pair of fixing parts at which said wire-form elastic members are fixed respectively is made different between both sides of said lens holder, comprising the steps of molding the lens holder and suspension member in an integral state out of a resin on the both ends of the wire-form elastic member so as to fix the suspension base to the actuator base and set the lens holder in a predetermined position, and thereafter positioning stopper members, which are used for restricting a range of a movement of the lens holder in the focusing direction, between the two elastic member-fixing parts of the lens holder set in a predetermined position.

* * * * *